US012723924B2

(12) United States Patent
Généreux et al.

(10) Patent No.: US 12,723,924 B2
(45) Date of Patent: Sep. 1, 2026

(54) MICROBOLOMETER DETECTORS WITH RESONANT CAVITIES FOR ENHANCED OPTICAL ABSORPTION

(71) Applicant: TECHNOLOGIES LUQIA, Québec (CA)

(72) Inventors: Francis Généreux, Québec (CA); Alex Paquet, Québec (CA); Hélène Spisser, Québec (CA); Hassane Oulachgar, Québec (CA); Jacques-Edmond Paultre, Québec (CA)

(73) Assignee: TECHNOLOGIES LUQIA, Quebec (CA)

( * ) Notice: Subject to any disclaimer, the term of this patent is extended or adjusted under 35 U.S.C. 154(b) by 261 days.

(21) Appl. No.: 18/411,365

(22) Filed: Jan. 12, 2024

(65) Prior Publication Data

US 2024/0240990 A1 Jul. 18, 2024

Related U.S. Application Data

(60) Provisional application No. 63/479,832, filed on Jan. 13, 2023.

(51) Int. Cl.
*G01J 5/0875* (2022.01)
*G01J 5/02* (2022.01)
*G01J 5/20* (2006.01)

(52) U.S. Cl.
CPC ............. *G01J 5/0875* (2013.01); *G01J 5/022* (2013.01); *G01J 5/20* (2013.01); *G01J 2005/202* (2013.01)

(58) Field of Classification Search
CPC .. G01J 5/0875; G01J 5/022; G01J 5/20; G01J 2005/202
See application file for complete search history.

(56) References Cited

U.S. PATENT DOCUMENTS 7,800,066 B2 9/2010 Talghader
8,629,398 B2 1/2014 Talghader et al.
(Continued)

FOREIGN PATENT DOCUMENTS

WO WO 2005043180 A2 * 5/2005 ............... H01Q 9/27

OTHER PUBLICATIONS

Cole, Barry E., et al. "Integrated vacuum packaging for low-cost lightweight uncooled microbolometer arrays." Infrared Technology and Applications XXVII. vol. 4369. SPIE, 2001. (Year: 2001).*

*Primary Examiner* — Uzma Alam
*Assistant Examiner* — Richard O Toohey
(74) *Attorney, Agent, or Firm* — Hamilton, Brook, Smith & Reynolds, P.C.

(57) ABSTRACT

A microbolometer detector for detecting electromagnetic radiation is disclosed. The microbolometer detector includes a substrate, a vacuum package, and an array of microbolometers disposed on the substrate inside the vacuum package. Each microbolometer includes a platform supported above the substrate, a thermistor disposed on the platform and having an electrical resistance that varies with its temperature, and an optical absorber including a frequency-selective surface and configured to absorb the electromagnetic radiation to generate heat and change the temperature of the thermistor. The microbolometer detector also includes a reflector disposed on the substrate under the array of microbolometers, and an optical window configured to allow the electromagnetic radiation to pass therethrough and reach the optical absorbers. The optical window is spaced apart from the reflector to form therebetween an optically resonant cavity. The resonant cavity is tuned to an absorption band of the optical absorbers.

20 Claims, 28 Drawing Sheets

(56) References Cited

U.S. PATENT DOCUMENTS

| | | | | |
|---|---|---|---|---|
| 8,849,075 | B2 | 9/2014 | Painter et al. | |
| 10,062,794 | B2 | 8/2018 | Meyer et al. | |
| 10,161,803 | B2 | 12/2018 | Carlson et al. | |
| 10,333,011 | B2 | 6/2019 | Meyer et al. | |
| 10,393,826 | B2 | 8/2019 | Parsa et al. | |
| 2008/0035846 | A1* | 2/2008 | Talghader | G01J 5/0893 250/338.1 |
| 2012/0161001 | A1* | 6/2012 | Bomfreund | H10F 39/011 438/54 |
| 2016/0178444 | A1* | 6/2016 | Oulachgar | G01J 3/36 250/349 |
| 2020/0025619 | A1* | 1/2020 | Almasri | G01J 5/046 |

* cited by examiner

MICROBOLOMETER DETECTORS WITH RESONANT CAVITIES FOR ENHANCED OPTICAL ABSORPTION

RELATED PATENT APPLICATION

The present application claims priority to U.S. Provisional Patent Application No. 63/479,832 filed on Jan. 13, 2023, the disclosure of which is incorporated herein by reference in its entirety.

TECHNICAL FIELD

The technical field generally relates to thermal detectors of electromagnetic radiation and, more particularly, to microbolometer detectors with resonant cavities for enhanced optical absorption.

BACKGROUND

Thermal detectors are devices that absorb energy from incident electromagnetic radiation and convert the absorption-generated heat into an electrical signal indicative of the amount of absorbed electromagnetic energy. Perhaps the most prominent thermal detectors currently available are based on arrays of uncooled microbolometers. A microbolometer typically includes a platform or bridge structure having a low thermal mass, which is suspended above and thermally insulated from a substrate by support members (e.g., including posts and arms). The platform is provided with a thermistor, which is a resistive element whose electrical resistance changes in response to temperature variations caused by the absorbed radiation. The thermistor is preferably composed of a material having a high temperature coefficient of resistance (TCR). Examples of thermistor material are vanadium oxide and amorphous silicon. Microbolometers also generally include optical absorbers to enhance their sensitivity and overall performance.

Microbolometers are generally encountered in the form of two-dimensional arrays, notably for use as image sensors for implementation into cameras. Microbolometer arrays can be manufactured on a common substrate using conventional integrated-circuit-based microfabrication techniques such as photolithography and surface or bulk micromachining. The constituent elements of the microbolometers may be successively deposited and patterned using thin-film deposition techniques paired with selective photoresist development and sacrificial etching processes. The substrate may be pre-manufactured with a readout integrated circuit (ROIC) using complementary metal-oxide-semiconductor (CMOS) processes. Because they do not require cryogenic cooling, uncooled microbolometers can operate at room temperature and can be used in various commercial, industrial, and military applications. Traditionally, uncooled microbolometers have been used to sense radiation in the infrared region of the electromagnetic spectrum, usually in the long-wave infrared, encompassing wavelengths ranging from about 8 μm to about 15 μm, but also in the mid-wave infrared, encompassing wavelengths ranging from about 3 μm to about 5 μm. More recently, research and development work has been carried out to extend the spectral response of uncooled microbolometers beyond the infrared range, notably in the far-infrared and terahertz (THz) spectral regions. Despite advances in the field, several challenges and hurdles remain, notably in developing efficient optical absorbers of electromagnetic radiation within these lower-energy and longer-wavelength regions.

SUMMARY

The present description generally relates to microbolometer detectors with optical absorption properties enhanced by the provision of a resonant cavity structure.

In accordance with an aspect, there is provided a microbolometer detector for detecting electromagnetic radiation, including:

- a substrate;
- a vacuum package;
- an array of microbolometers disposed on the substrate inside the vacuum package, each microbolometer including:
  - a platform supported above the substrate;
  - a thermistor disposed on the platform and having an electrical resistance that varies with a temperature of the thermistor; and
  - an optical absorber in thermal contact with the thermistor and including a frequency-selective surface, the optical absorber being configured to absorb the electromagnetic radiation to generate heat and change the temperature of the thermistor;
- a reflector disposed on the substrate under the array of microbolometers; and
- an optical window configured to allow the electromagnetic radiation to pass therethrough and reach the optical absorbers, wherein the optical window is spaced apart from the reflector to form therebetween an optically resonant cavity having a cavity depth, the resonant cavity being tuned to an absorption band of the optical absorbers.

In some embodiments, the absorption band of the optical absorbers extends at least partly within a waveband ranging from about 30 μm to about 3000 μm.

In some embodiments, the microbolometer detector further includes an antireflective structure provided on at least one of an inner surface and an outer surface of the optical window. In some embodiments, the antireflective structure includes an antireflective coating deposited on the optical window. In other embodiments, the antireflective structure includes an antireflective pattern etched into the optical window.

In some embodiments, the vacuum package includes a package window that provides the optical window of the resonant cavity.

In some embodiments, the vacuum package includes a package window distinct from the optical window and configured to allow the electromagnetic radiation to pass therethrough and reach the optical absorbers.

In some embodiments, the optical window is disposed inside the vacuum package. In some of these embodiments, the cavity depth is smaller than $\lambda/2n_c$, where $\lambda$ is a wavelength of interest of the electromagnetic radiation absorbed by the optical absorbers and $n_c$ is the effective refractive index of the resonant cavity. For example, a ratio of the wavelength of interest to the cavity depth can range from about 2 to 600.

In some embodiments, the optical window is disposed outside the vacuum package.

In some embodiments, the microbolometer detector further includes a height-control device (e.g., a piezoelectric-based device) configured to support the optical window and control its height above the package window to adjust the cavity depth.

In some embodiments, the optical window includes a Bragg cavity structure or a Bragg grating structure.

In some embodiments, the optical window is made up of a material having a refractive index greater than two in a spectral region overlapping with the absorption band of the optical absorbers.

In some embodiments, the microbolometer detector further includes at least one optical filter provided on the optical window. In embodiments where the optical window is provided with an antireflective structure, the optical filter may be interposed between the optical window and the antireflective structure.

In some embodiments, the reflector includes a high-impedance surface configured to control a reflection phase change of the electromagnetic radiation incident thereon to allow the resonant cavity to be tuned to the absorption band of the optical absorbers with a reduced value of the cavity depth.

In some embodiments, the optical window includes at least one metasurface configured to control a reflection phase change of the electromagnetic radiation incident thereon to allow the resonant cavity to be tuned to the absorption band of the optical absorbers with a reduced value of the cavity depth.

In some embodiments, the microbolometer detector further includes a stiffening structure configured to mechanically strengthen the optical window.

In some embodiments, the vacuum package and the optical window are formed by wafer-level packaging.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another, unless stated otherwise.

DETAILED DESCRIPTION

Figure 1:
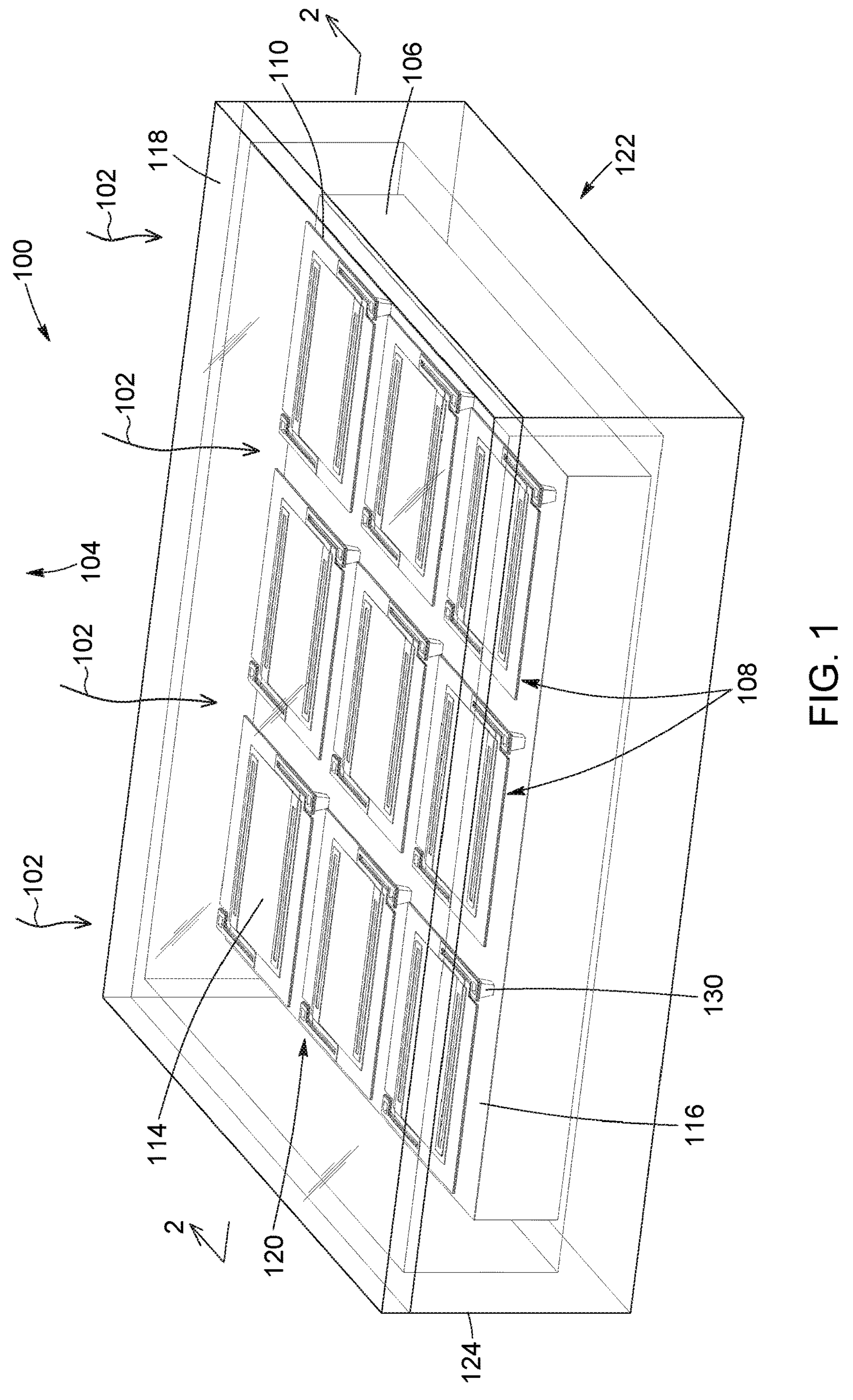
FIG. 1 is a schematic perspective view of a microbolometer detector, in accordance with an embodiment.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Positional descriptors indicating the location or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application, or that fall within an acceptable range of experimental error. In particular, the term "about" generally refers to a range of numbers that one skilled in the art would consider equivalent to the stated value (e.g., having the same or nearly the same function or result). In some instances, the term "about" means a variation of +10% of the stated value. It is noted that all numerical values used herein are assumed to be modified by the term "about", unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The present description generally relates to microbolometer detectors whose optical absorption performances are enhanced by a resonant-cavity effect. The present techniques have potential use in various commercial, industrial, and military applications. Non-limiting examples of possible fields of use include defense and security, aerospace and astronomy, inspection and maintenance, transportation, pollution, spectroscopy, remote sensing, industrial control, robotics, and medicine. In some embodiments, the present techniques enable the development of microbolometer detectors exhibiting enhanced absorption spectra at terahertz frequencies.

The term "microbolometer" refers herein to a thermal sensor that includes a thermistor. Microbolometers operate by absorbing part of the electromagnetic radiation incident thereon, converting the absorbed radiation into heat, and sensing the resulting temperature increase through a change of the electrical resistance of the thermistor. Microbolometers can be classified as either cooled or uncooled, depending on whether their operation involves detector cooling or not. The theory, structure, operation, and applications of microbolometer detectors are generally known in the art and need not be described in detail herein other than to facilitate an understanding of the present techniques. It is noted that the terms "microbolometer" and "bolometer" can generally be used interchangeably in the present description.

The terms "light" and "optical", and variants and derivatives thereof, refer herein to radiation in any appropriate region of the electromagnetic spectrum. These terms are not limited to visible light, but may also include, without being limited to, the infrared, terahertz, and millimeter wave regions. The term "terahertz radiation" refers herein to electromagnetic radiation having a center wavelength ranging from about 30 μm to about 3000 μm, corresponding to frequencies ranging from about 0.1 THz to about 10 THz. The definition of the term "terahertz radiation" with reference to a particular spectral range may vary depending on the technical field or standard under consideration and is not meant to limit the scope of application of the present techniques. In this regard, embodiments operating in different frequency ranges may be characterized by different microbolometer architectures, different material properties, and/or different microfabrication processes.

The term "optical absorber" refers herein to a material or structure which, upon exposure to electromagnetic radiation within a certain waveband or a set of wavebands, absorbs electromagnetic energy from the electromagnetic radiation within that waveband or that set of wavebands and converts the absorbed electromagnetic energy into thermal energy.

Optical absorbers used in microbolometers can generally be classified into two main categories. The first category includes optical absorbers that operate by providing broadband absorption of radiation, such as porous metal-black films (e.g., gold-black films), porous carbon-based films (e.g., carbon-nanotube-based films and graphene-based films), porous polymers films, and aerogel films. The second category includes thin metallic films and structures that operate based on impedance-matching techniques, such as Salisbury screen absorbers and other similar arrangements. Each of these two categories of optical absorbers has advantages and disadvantages depending on the targeted operation wavelength and spectral bandwidth. One of their disadvantages is that they tend to exhibit negligible thin-film absorption at longer wavelengths (e.g., longer than about 300 μm), which poses a challenge to their use in terahertz applications.

For optical absorbers belonging to the first category, the incident radiation is absorbed by scattering, multiple reflections, and power losses inside a relatively thick film. Because satisfactory absorption performance is expected to be achieved when the thickness of the films is equal to or greater than a quarter of the wavelength of interest, these absorbers can become impractically thick beyond certain wavelengths (e.g., beyond 300 μm), thus hampering their use at THz frequencies.

For optical absorbers belonging to the second category, their implementation in microbolometer detectors involves forming a resonant cavity between a resistive optical absorber disposed on the platform and a reflector disposed on the substrate. When the height of the absorber above the reflector is equal to an odd number of quarter wavelengths of the incoming radiation and the sheet resistance of the absorber matches the impedance of free space, enhanced absorption of the incoming radiation is achieved in the absorber. The enhanced absorption is due to destructive interference between the radiation reflected by the absorber and the radiation reflected by the reflector. Since forming a quarter-wavelength resonant cavity using existing microfabrication techniques based on surface micromachining can become impractical above 100-μm wavelengths, using the second category of optical absorbers in THz applications can also present a number of challenges.

In this context, the present techniques disclose various embodiments of microbolometer detectors provided with resonant cavities that promote enhanced optical absorption at THz frequencies.

Figure 2:
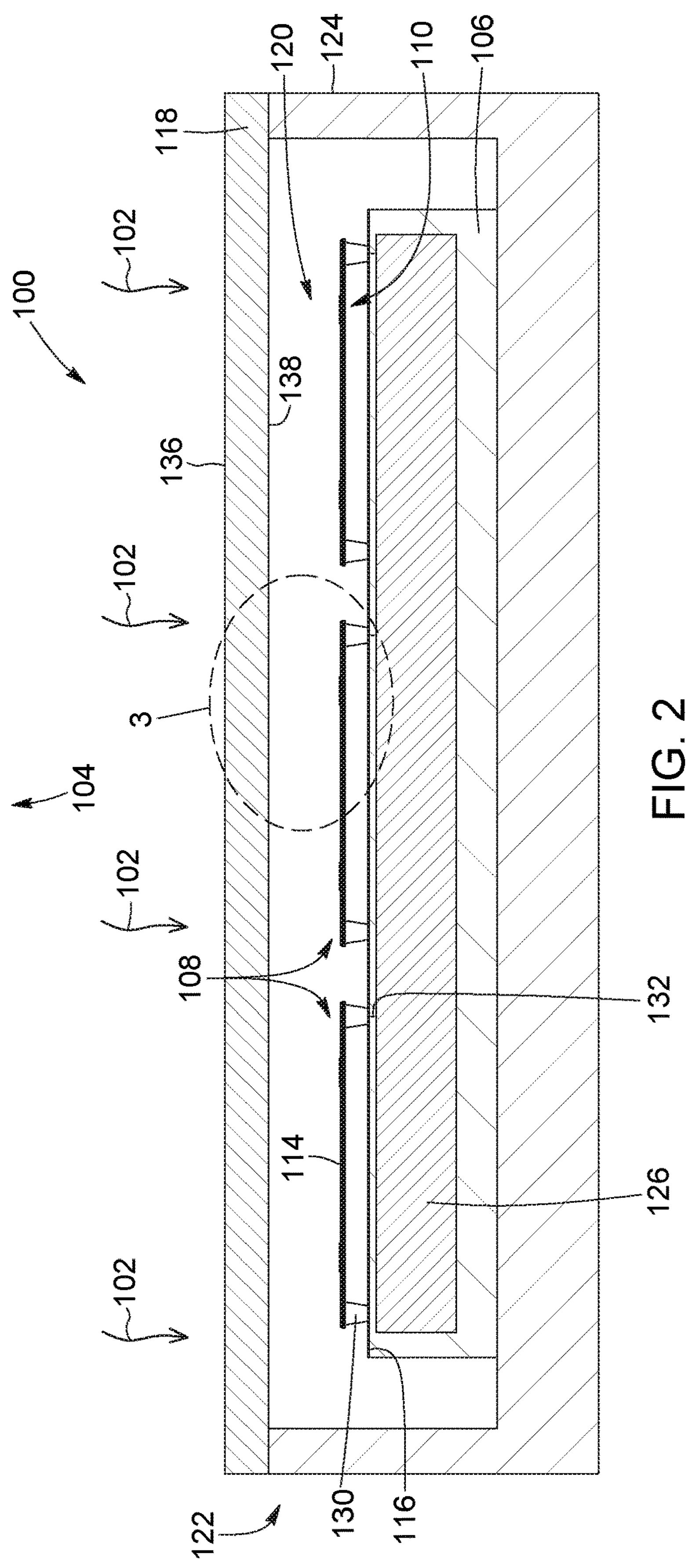
FIG. 2 is a cross-sectional elevation view of the microbolometer detector of FIG. 1.
Figure 3:
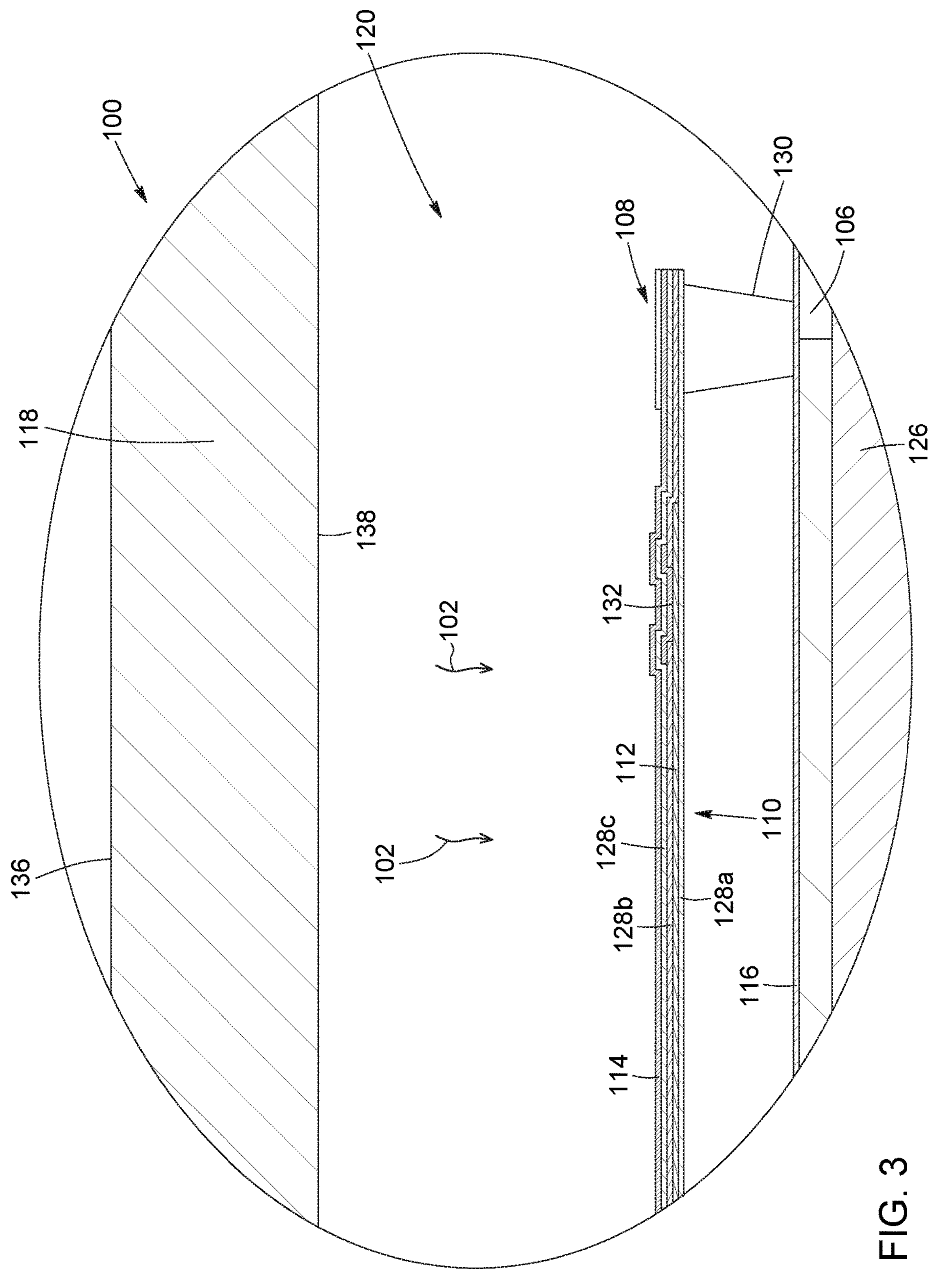
FIG. 3 is an enlargement of portion 3 of FIG. 2.

Referring to FIGS. 1 to 3, there are illustrated schematic views of an embodiment of a microbolometer detector 100 configured for detecting electromagnetic radiation 102 received from a scene 104. The microbolometer detector 100 includes a substrate 106 and an array of microbolometers 108 disposed on the substrate 106. Each microbolometer 108 includes a platform 110 supported above the substrate 106, a thermistor 112 disposed on the platform 110, and an optical absorber 114 in thermal contact with the thermistor 112. The thermistor 112 has an electrical resistance that varies with the temperature of the thermistor 112. The optical absorber 114 is configured to absorb the electromagnetic radiation 102 received thereon in accordance with its absorption spectrum to generate heat and change the temperature of the thermistor 112. The microbolometer detector 100 may be implemented as an image sensor of a camera or another type of imaging device, in which case the microbolometers 108 correspond to the individual pixels of the image sensor.

The microbolometer detector 100 also includes a reflector 116 disposed on the substrate 106 under the array of microbolometers 108, and an optical window 118 configured to allow the electromagnetic radiation 102 to pass therethrough prior to reaching the optical absorbers 114. The reflector 116 and the optical window 118 are spaced apart from each other to form an optically resonant cavity 120 therebetween. The reflector 116 may be embodied by a uniform or patterned metallic layer (e.g., a thin film of aluminum, gold, or silver) configured to provide a highly reflecting surface within the spectral range of interest. The microbolometer detector 100 includes a vacuum package 122 configured to hermetically enclose the array of microbolometers 108 in a low-pressure environment defined by a vacuum level. For example, the vacuum level inside the vacuum package 122 can range from about 0.1 mTorr to about 100 mTorr. The vacuum package 122 includes a package enclosure 124 that contains the substrate 106 and the microbolometers 108, and a package window that provides the optical window 118 associated with the resonant cavity 120. In other embodiments, the package window associated with the vacuum package 122 and the optical window 118 associated with the resonant cavity 120 correspond to two distinct windows.

The resonant cavity 120 is tuned to an absorption band of the optical absorbers 114 in order to enhance their absorption performance. The resonant cavity 120 can be tuned in various ways, for example by adjusting its geometrical parameters, its optical parameters, or both. Non-limiting examples of such parameters include the separation distance between the reflector 116 and the optical window 118, the thickness of the optical window 118, the transmittance of the optical window 118, and the reflection phase changes at the reflector 116 and/or the optical window 118. One possible benefit of using a resonant-cavity-based approach to absorption enhancement is that this approach can allow the performance of the microbolometer detector 100 to be improved with no or negligible change to its thermal mass, and thus to its thermal time constant.

The structure, configuration, and operation of the above-mentioned components and other possible components of the microbolometer detector 100 are discussed in greater detail below. It is noted that FIGS. 1 to 3 are simplified representations that aim to illustrate a number of features and components of the microbolometer detector 100, such that additional features and components that may be useful or necessary for its practical operation may not be specifically depicted.

The microbolometer detector 100 can be fabricated using common integrated-circuit and microfabrication techniques such as surface and bulk micromachining. In such techniques, the constituent elements of the microbolometer detector 100 can be successively deposited and patterned on a substrate using thin-film deposition techniques combined with selective photoresist development and sacrificial layer etching processes. In some embodiments, the microbolometer detector 100 can be fabricated using a monolithic integration approach in which the substrate 106, typically provided with an underlying readout integrated circuit (ROIC), is pre-manufactured using CMOS processes. However, various other fabrication techniques are contemplated in other embodiments.

The substrate 106 provides mechanical support to the other components of the microbolometer detector 100. The substrate 106 may be made of silicon (Si), silicon carbide (SiC), gallium arsenide (GaAs), gallium nitride (GaN), germanium (Ge), or of any other suitable substrate material or combination of substrate materials. For example, the substrate 106 may be a die separated from a semiconductor wafer, for example, a silicon wafer. The microbolometer detector 100 may include an electrical readout circuit 126, which may be embodied by one or more CMOS circuitry layers formed in or on the substrate 106. Alternatively, the electrical readout circuit 126 may be arranged fully or partially outside the substrate 106.

FIGS. 1 to 3 depict the microbolometer detector 100 as including only nine microbolometers 108 for clarity. However, in practice, the number of microbolometers 108 in the array will generally be larger. For example, in some embodiments the microbolometer detector 100 may include from about 32×24 to about 2048×1536 microbolometers 108, and the spacing (or pixel pitch) between nearest-neighbor microbolometers 108 may range from about 5 μm to about 500 μm. Depending on the application, the microbolometers 108 may be arranged in a regular linear or two-dimensional array, or be provided at arbitrary locations that do not conform to any specific pattern.

The term “platform” refers herein to a substantially planar structure supported above the substrate 106, with generally greater horizontal dimensions than vertical thickness. The term “horizontal” refers herein to directions lying in a plane generally parallel to the substrate 106, while the term “vertical” refers to a direction generally perpendicular to the plane of the substrate 106. Supporting the platform 110 above the substrate 106 provides thermal isolation to the thermistor 112 in order to enhance the detection sensitivity of the microbolometer 108. The platform 110 may be a single or multilayer structure made of a low-stress and self-supporting material, such as silicon nitride, silicon dioxide, silicon oxynitride or other suitable dielectric materials. For example, FIG. 3 shows that the platform 110 of the illustrated embodiment includes three platform layers 128*a*, 128*b*, 128*c*. The platform 110 may have horizontal dimensions ranging from about 5 μm to about 500 μm, although other platform dimensions may be used in other embodiments. The platform 110 may be provided in a variety of sizes, shapes, and configurations.

Each microbolometer 108 includes a support structure 130 configured to support the platform 110 above the substrate 106. The support structure 130 is configured to hold the platform 110 in a spaced-apart relationship above the substrate 106, for example at a height ranging from about 0.5 μm to about 5 μm. Other height values are possible in other embodiments. The support structure 130 may be located close to the center of the platform 110, close to the periphery (e.g., the corners) of the platform 100 or at both locations. The support structure 130 may be made of a low-stress and self-supporting material such as silicon nitride, silicon dioxide, silicon oxynitride or other suitable dielectric materials. The support structure 130 may have a variety of configurations to meet the mechanical, electrical, and/or thermal requirements or preferences of a given application.

The thermistor 112 has an electrical resistance responsive to variations of its temperature resulting from the heat generated by the absorption of electromagnetic energy by the optical absorber 114. The term “thermistor” refers herein to any suitable structure or device having an electrical resistance that changes as a function of its temperature, generally in a predictable and controllable manner. The thermistor 112 may be made of a material having a high temperature coefficient of resistance (TCR) at room temperature, for example, a TCR of at least 0.5% per kelvin in absolute value. Non-limiting examples of thermistor materials include, to name a few, vanadium oxide, amorphous silicon, and titanium oxide. However, other thermistor materials or combinations of thermistor materials are contemplated, such as semiconductor-based, ceramic-based, polymer-based, and metal-based thermistors, with either positive or negative TCRs. In the embodiment of FIGS. 1 to 3, each microbolometer 108 includes a single thermistor 112, but configurations in which individual microbolometers 108 include multiple thermistors are possible in other embodiments. The size, shape, composition, number and arrangement of the thermistors may be varied in accordance with a given application.

Each microbolometer 108 can include an electrode structure 132 electrically connecting the thermistor 112 to the electrical readout circuit 126. The electrode structure 132 extends along the platform 110, the support structure 130, and the substrate 106 to provide an electrically conductive path between the thermistor 112 and the electrical readout circuit 126. The electrode structure 132 may be made of any suitable electrically conducting material including, to name a few, gold, aluminum, titanium, titanium nitride, copper, silver, tungsten, chromium, nichrome, and vanadium. The size, shape, composition, and arrangement of the electrode structure 132 may be varied in accordance with a given application.

The electrical readout circuit 126 is configured to measure, via the electrode structure 132, the changes in the electrical resistance of the thermistor 112 of each individual microbolometer 108. The electrical readout circuit 126 is also configured to provide an electrical output signal (e.g., a voltage and/or a current) whose amplitude is representative of the measured resistance variations (e.g., with respect to a reference microbolometer configured to track the variations of the substrate temperature). The electrical readout circuit 126 may include a number of passive and/or active components (e.g., analog-to-digital converters, buffers, integrators, timing components) and may be implemented using a variety of circuit architectures and designs.

Referring still to FIGS. 1 to 3, the optical absorber 114 is disposed over and in thermal contact with the thermistor 112. In this manner, when the optical absorber 114 is heated upon absorption of electromagnetic radiation 102, the heat thus generated is conducted, radiated, or otherwise transmitted to the thermistor 112. In the present description, the term “thermal contact” generally means that heat conduction occurs directly or indirectly between two elements, that is, the two elements may be either in direct contact with each other or have a thermally conducting material interposed between them. For example, FIG. 3 shows that the optical absorber 114 of the illustrated embodiment is separated from the thermistor 112 by two intervening platform layers 128*b*, 128*c*.

The optical absorbers 114 used in the various embodiments disclosed herein may be embodied by any suitable material, structure, or device configured for absorption of electromagnetic radiation in a waveband of interest. In some embodiments, the waveband of interest is within the THz region of the electromagnetic spectrum. In other embodiments, the waveband of interest is within another spectral region, for example the infrared region. In some embodiments, the optical absorbers 114 can be designed to provide broadband absorption over a relatively wide spectral range.

In other embodiments, the optical absorbers 114 can be designed to provide narrowband absorption in one or a few narrower spectral bands.

In some embodiments, the optical absorbers 114 can include frequency-selective surfaces (FSSs). The term "frequency-selective surface" refers herein to any planar structure of periodically arranged unit cells whose geometrical parameters are designed to control the spectral filtering action of the structure in response to electromagnetic radiation impinging thereon. The unit cells can be in the form of wires, meshes, patches, slots or any other suitable shapes or combinations of shapes configured to achieve band-pass, band-stop, or other absorption characteristics over a certain spectral range. In some embodiments, the FSS-based optical absorbers 114 may include or be part of a multilayer structure formed of one or more electrically conductive layers (e.g., made of metal and/or semiconductor materials) and one or more electrically insulating layers (e.g., made of dielectric materials) whose structure, configuration, and material composition are selected to favor absorption of electromagnetic radiation in a given frequency band, for example THz radiation. The materials forming the FSS-based optical absorbers 114 can be selected to control the spectral response of the microbolometer detector 100 and/or to ensure compatibility with thin-film deposition and processing techniques. In some embodiments, the FSS-based optical absorbers 114 may be patterned in order to tailor the spectral response of the microbolometer detector 100. The patterns may correspond to any regular or irregular arrangement of unit cells including, but not limited to, lines, squares, hexagons, triangles, circles, grids, crosses, and any other suitable shapes or combinations of shapes. Various characteristics of the FSSs related to their material (e.g., electrical conductivity, refractive index, extinction coefficient) and/or geometrical (e.g., length, width, thickness, shape, and arrangement) properties can be selected to control their absorption characteristics. FSS-based optical absorbers often exhibit narrowband absorption spectra, although broadband absorption is possible in some embodiments.

In other embodiments, the optical absorbers 114 can include porous absorbers such as porous metal-black films (e.g., gold-black films) and porous carbon-based films (e.g., carbon-nanotube-based films). Porous optical absorbers can have a thickness ranging from about 10 μm to about 500 μm and are generally thicker than FSS-based optical absorbers, whose thicknesses usually range from about 0.1 μm to about 0.5 μm. Porous optical absorbers often exhibit broadband absorption spectra, although narrowband absorption is possible in some embodiments.

In the embodiment of FIGS. 1 to 3, the resonant cavity 120 includes a first cavity end provided by the reflector 116 and a second cavity end provided by the optical window 118. As noted above, the optical window 118 in the illustrated embodiment is embodied by the package window of the vacuum package 122. Windows of vacuum packages generally have a high optical transmittance in the wavelength range of interest to reduce optical absorption losses in the window. The transmittance of a window of refractive index $n_w$ and thickness $t_w$ located in a medium of refractive index $n_0=1$ and illuminated at normal incidence with radiation of wavelength $\lambda$ in vacuum is maximum when $t_w=p\lambda/2n_w$ (constructive interference condition) and minimum when $t_w=(2p-1)\lambda/4n_w$ (destructive interference condition), where p is a positive integer referred to as the order of interference.

While the transmittance of the optical window 118 can be high, its reflectance is generally not strictly equal to zero, so that the window can effectively be used together with the reflector 116 to form a resonant cavity 120 tuned to an absorption band of the optical absorbers 114 to provide enhanced absorption performance. The resonant cavity 120 can be tuned by forming a standing-wave pattern from the electromagnetic radiation 102 received therein. In this manner, the round-trip phase accumulation of the electromagnetic wave circulating inside the resonant cavity 120 is made equal to an integer multiple of $2\pi$ at a frequency matching an absorption band of the optical absorbers 114, such that the standing wave will lead to enhancement of the amount of optical power absorbed by the optical absorbers 114. When achieving these conditions, the electromagnetic field within the optical absorbers 114 is amplified, and a corresponding increase in the amount of electromagnetic power absorbed by the optical absorbers 114 is observed.

The condition of constructive interference on the round-trip phase accumulation inside the resonant cavity 120 can be expressed mathematically as follows:

$$\frac{4\pi n_c d_c}{\lambda} + \phi_1 + \phi_2 = 2\pi m, \tag{1}$$

where $n_c$ is the effective refractive index of the cavity, $d_c$ is the depth of the cavity, $\phi_1$ is the reflection phase change undergone by the electromagnetic wave impinging on the first end of the resonant cavity 120 (i.e., at the reflector 116), $\phi_2$ is the reflection phase change at the second end of the resonant cavity 120 (i.e., at the optical window 118) and m is a positive integer.

Figure 4:
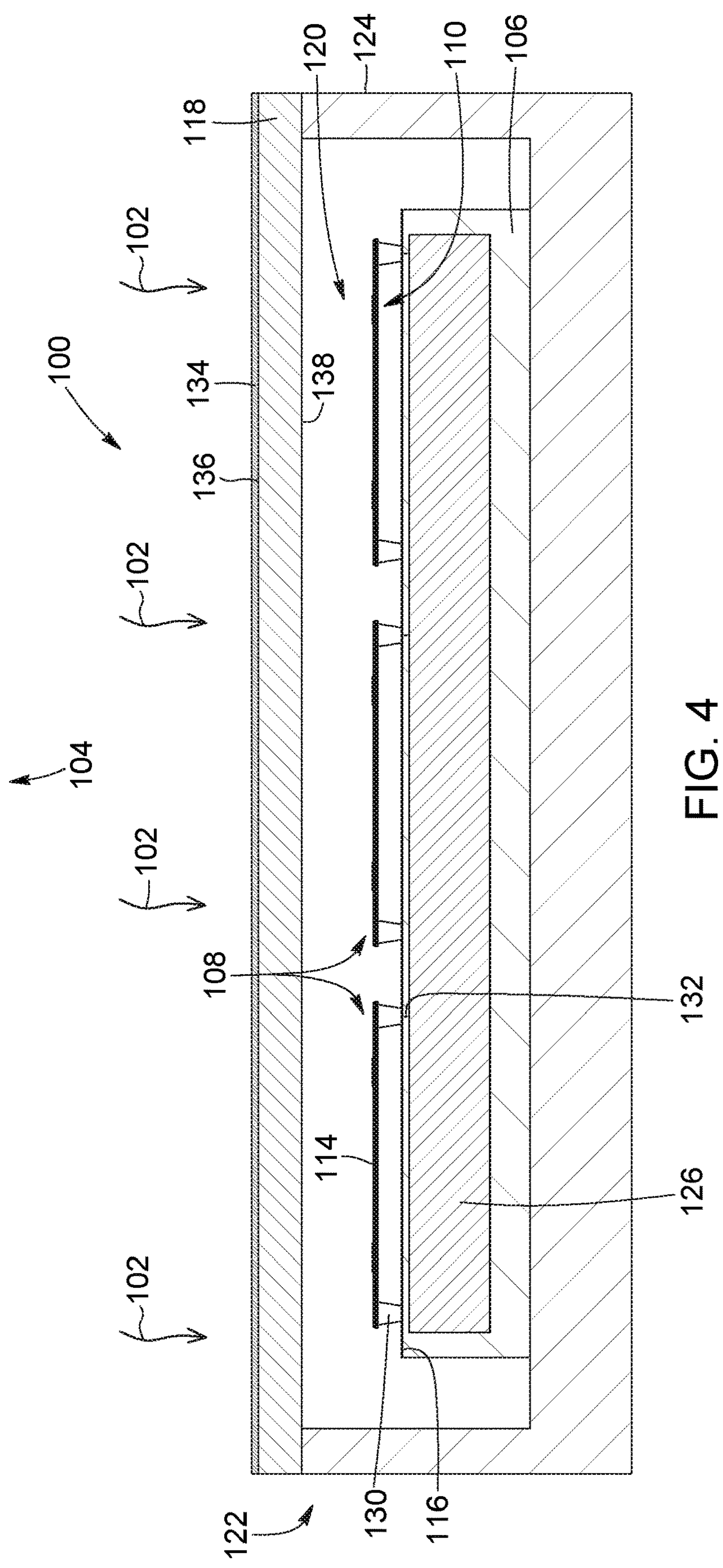
FIG. 4 is a schematic cross-sectional elevation view of a microbolometer detector, in accordance with another embodiment.

A simplified version of Equation (1) using idealized values for ø1 and Ø2 will be considered with reference to FIG. 4, which illustrates another embodiment of a microbolometer detector 100 configured for detecting electromagnetic radiation 102 received from a scene 104. The embodiment of FIG. 4 shares several features with previously described embodiments, which will not be described again in detail other than to highlight differences between them. The embodiment of FIG. 4 differs from that of FIGS. 1 to 3 in that the microbolometer detector 100 includes an antireflective (AR) structure 134 formed on the outer surface 136 of the optical window 118 (i.e., the surface of the optical window 118 facing away from the interior of the resonant cavity 120). For example, the AR structure 134 can be an AR coating made of one or more thin-film layers. The AR structure 134 is configured to provide negligible reflection of the radiation incident thereon in a waveband that overlaps the absorption band of interest of the optical absorbers 114.

Considering that the refractive index of the reflector 116 is generally higher than the effective refractive index $n_c$ of the resonant cavity 120 and assuming that the reflector 116 is lossless and the microbolometers 108 and the optical absorbers 114 have negligible impacts on the reflection phase change or the impedance of the reflector 116, the value of $\phi_1$ can be set equal to $\pi$. It is worth nothing that since an FSS-based optical absorber 114 forms an intrinsic cavity with the reflector 116, this condition is generally not met and electromagnetic simulations are used to compute the value of $\phi_1$. The approximations made in the present discussion are for better ease of understanding.

The value for $\phi_2$ can be determined by considering the normal-incidence reflectance R at the inner surface 138 of the optical window 118 (i.e., the surface of the optical window 118 facing toward the interior of the resonant cavity 120), which can be expressed as follows:

$$R = \frac{Z_{eff} - Z_c}{Z_{eff} + Z_c} = \frac{n_c - n_{eff}}{n_c + n_{eff}}, \quad (2)$$

where $Z_{eff}$ is the effective impedance of the optical window 118 as seen from within the resonant cavity 120 and $Z_c$ is the effective impedance of the resonant cavity 120. Equation (2) assumes that the media are non-magnetic, such that $Z_{eff}=Z_0/n_{eff}$ and $Z_c=Z_0/n_c$, where $n_{eff}$ is the effective refractive index of the optical window 118 and $Z_0$ is the impedance of free space. Assuming that the AR structure 134 is perfect at the wavelength of interest, $Z_{eff}$ and $n_{eff}$ in Equation (2) reduce to $Z_w$ and $n_w$, which are the intrinsic impedance and refractive index of the optical window 118, respectively. Furthermore, if the optical window 118 can be assumed to be lossless and if $n_w$ is higher than $n_c$, one finds that $\phi_2$ is also equal to $\pi$.

Using $\phi_1=\phi_2=\pi$ in Equation (1) yields the following simplified expression for the depth of the cavity:

$$d_c = \frac{(m-1)\lambda}{2n_c}. \quad (3)$$

Equation (3) provides that a standing wave pattern will occur inside the resonant cavity 120 when the depth $d_c$ of the resonant cavity 120 is equal to an integer number of half wavelengths in the cavity. Due to the provision of the AR structure 134 on the outer surface 136 of the optical window 118, the depth $d_c$ in Equation (3) corresponds to the vertical spacing between the reflector 116 and the inner surface 138 of the optical window 118. In some embodiments, the cavity depth $d_c$ can range from about 10 μm to about 5000 μm, although other values of the cavity depth can be used in other embodiments.

Figure 5:
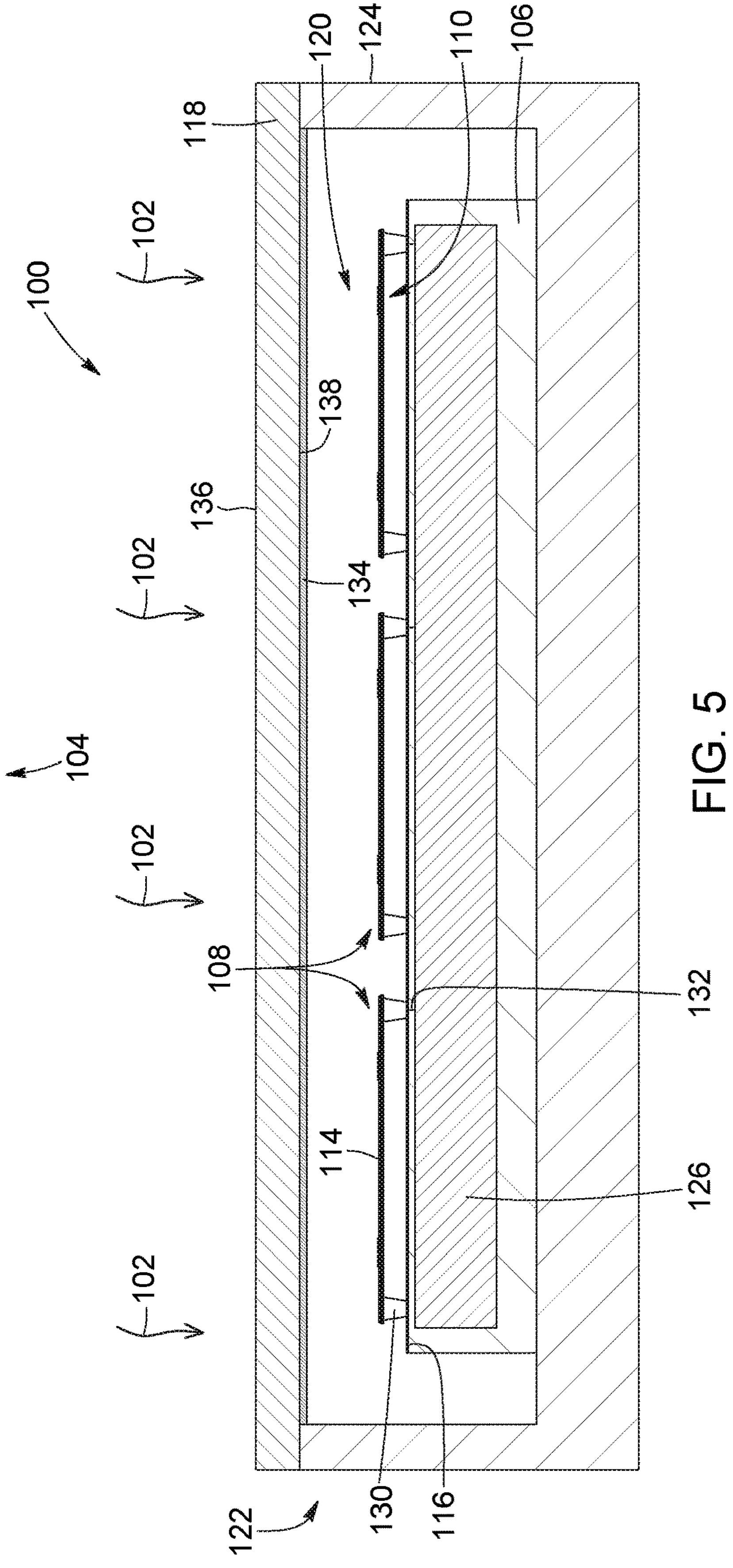
FIG. 5 is a schematic cross-sectional elevation view of a microbolometer detector, in accordance with another embodiment.

In other embodiments, an AR structure 134 may be formed on the inner surface 138 of the optical window 118 instead of on the outer surface 136. In such a case, the depth $d_c$ of the resonant cavity 120 would be defined as the vertical spacing between the reflector 116 and the outer surface 136 of the optical window 118. An example of such a configuration is depicted in FIG. 5. Using the same assumptions as those used to obtain Equation (3), this configuration would yield $\phi_1=\pi$, $\phi_2=0$, and $$d_c = \frac{(2m-1)\lambda}{4n_c} + \frac{(n_w - n_c)t_w}{n_c}. \quad (4)$$

Figure 6:
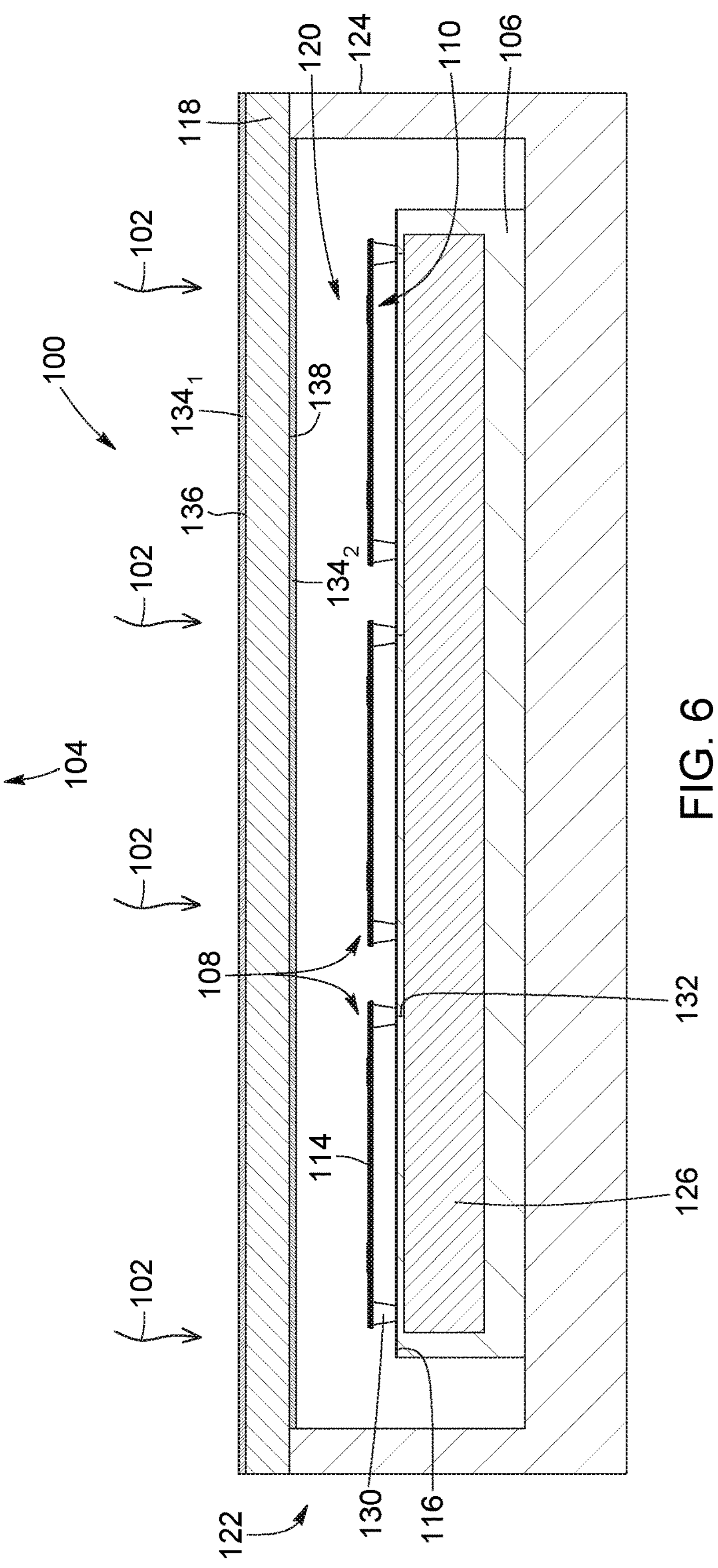
FIG. 6 is a schematic cross-sectional elevation view of a microbolometer detector, in accordance with another embodiment.

In yet other embodiments, two AR structures may be provided on the optical window 118, namely a first AR structure $\mathbf{134}_1$ formed on the outer surface 136 and a second AR structure $\mathbf{134}_2$ formed on the inner surface 138. An example of such a configuration is depicted in FIG. 6. In such embodiments, the first AR structure $\mathbf{134}_1$ may be configured to eliminate reflection in a first waveband while the second AR structure $\mathbf{134}_2$ may be configured to eliminate reflection in a second waveband different from the first waveband. In this case, the resonant cavity 120 may provide enhanced absorption simultaneously in both first and second wavebands.

Figure 7:
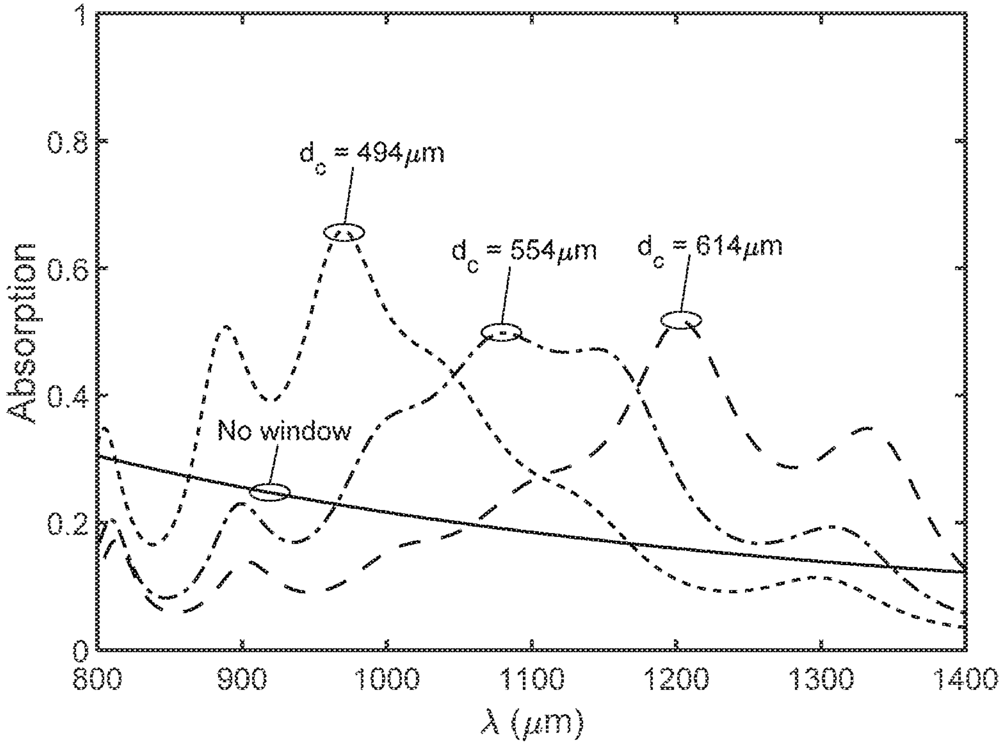
FIG. 7 is a graph depicting four absorption spectra obtained by electromagnetic simulations of four different microbolometer detectors. Three of the curves represent the absorption spectra of microbolometer detectors similar to the one illustrated in FIG. 4, each curve corresponding to a different value of the cavity depth $d_c$. The fourth curve represents the absorption spectra of a windowless microbolometer detector.

Referring to FIG. 7, there is shown a graph depicting four absorption spectra obtained by electromagnetic simulations of four different microbolometer detectors including porous optical absorbers. Three of the curves represent the absorption spectra of microbolometer detectors similar to the one illustrated in FIG. 4, but each curve corresponds to a different value of the cavity depth $d_c$. The fourth curve represents the absorption spectra of a windowless microbolometer detector. FIG. 7 shows that the larger the depth $d_c$ of the resonant cavity, the longer the wavelength of its fundamental mode which, according to Equation (3), is equal to $2n_cd_c$. It can also be seen from FIG. 7 that relatively small variations of the cavity depth can lead to significant variations of the profile and peak position of the absorption spectrum. Having a fine control over the cavity depth can help ensure fabrication uniformity not only between different microbolometer detectors, but also within the same microbolometer detector, as a detector suffering from a nonuniform response across its field of view can be a drawback in imaging and other applications. The ability to finely control the cavity depth can become particularly important when the absorption spectra exhibit one or a few narrow peaks.

Further aspects and features of the present techniques are discussed below, including aspects and features related to the impacts of several parameters on the response of various embodiments of microbolometer detectors provided with resonant-cavity-enhanced optical absorption performances.

Impact of the Cavity Depth on the Bandwidth of the Absorption Spectrum

Resonance bandwidths of absorption spectra depend on various factors, including the intracavity losses, the impedance of the optical window, and the cavity depth $d_c$. In particular, the larger the cavity depth $d_c$, the lower the bandwidth. While a low bandwidth can be useful in some applications, a large bandwidth can be desirable in other applications, notably in THz imaging applications. One reason is that microbolometer detectors with large absorption bandwidths can be used with broadband light sources having low temporal coherence, which in turn can help reduce adverse coherence artifacts. In addition, a larger absorption bandwidth can be less sensitive to the angle of incidence of the incoming radiation. For these reasons, reducing the cavity depth $d_c$ to increase the absorption bandwidth can be beneficial in some applications, which can be achieved by selecting a small value of m in Equation (1) or (3). For example, Equation (3) yields $d_c=\lambda/2n_c$ when m=2.

Impact of the Angle of Incidence

The resonance condition depends on the angle of incidence of the electromagnetic radiation received in the cavity. The further away from normal incidence, the longer the optical path inside the cavity, and thus the longer the wavelength required to meet the constructive interference condition. Depending on the optical design of the objective lens, this effect can cause a redshift of the resonance, in which microbolometers located closer to the edge of the array have a resonance wavelength longer than those located closer to the center, leading to a nonuniform response within the array that ultimately can limit the field of view of the detector. Non-limiting approaches to overcoming or at least mitigating this issue include using a small cavity depth $d_c$ to increase the absorption bandwidth and increasing the refractive index $n_c$ of the cavity to reduce the optical path difference caused by the distribution of the angles of incidence.

Impact of the Cone of Angles of Incidence

Microbolometer detectors are often referred to as focal plane array (FPA) detectors because they are usually located at the focal plane of the objective lens of the imaging system in which they are integrated. The objective lens is configured to capture electromagnetic radiation coming from a scene and focus it onto the FPA detector. In such implementations, the f-number of the lens may be limited or otherwise affected by the dependence of the resonance condition on the angle of incidence. The depth of focus represents the range of distances within which the image sensor (e.g., the microbolometer detector) can be moved in relation to the lens while the generated images remain substantially in focus. In some embodiments, the depth of focus (DOF) can be expressed mathematically as follows:

$$DOF = 2F^2 \lambda n_c, \quad (5)$$

where F is the f-number of the lens, which is inversely related to the maximum opening angle of the cone of incidence. Because the radius of curvature of wavefronts is large in comparison with the depth of focus, the electromagnetic radiation incident on the microbolometer detector behaves essentially as plane waves within this region. In cases where the effective length associated with the photon lifetime is smaller than the depth of focus, the incident radiation is essentially absorbed before diverging, and thus the dependence on the cone angle may be neglected in first order. The absorption can thus remain mostly unchanged by the decrease of the f-number up to the point where the depth of focus becomes comparable with the effective length associated with the photon lifetime. When this situation occurs, the divergence may not only impact the absorption spectrum, but also contribute to enlarge the point spread function (PSF). Since smaller f-number values are often associated with higher spatial resolution and sensitivity, it is desirable in some embodiments to make the photon lifetime as short as possible. In some embodiments, the photon lifetime may be reduced without compromising the detector absorption by increasing the intrinsic absorption of the optical absorber or by decreasing the cavity depth. Since increasing the intrinsic absorption of the optical absorber 114 may not be possible in some embodiments, decreasing the cavity depth may be achieved by operating on the lower-order resonance modes of the cavity.

In addition to operating on the lower-order resonance modes, increasing the effective refractive index $n_c$ of the cavity may also be beneficial for reducing the smallest permissible f-number value, $F_{min}$, for which the depth of focus remains larger than the effective length associated with the photon lifetime. Setting the depth of focus equal to this effective length, one finds that $F_{min}$ scales as $1/n_c$, such that increasing ne can provide a way to reduce $F_{min}$. Another approach to reducing the photon lifetime may be to use an optical window with lower reflectance, although it may be at the expense of the absorption gain provided by the cavity. Control over the absorption gain for a given $F_{min}$ can be achieved by proper engineering of the photon lifetime.

Impact of Window Material Selection

The optical window may be made of any window material with required or desired characteristics. Non-limiting examples of such characteristics include the transmittance, the refractive index, the coefficient of thermal expansion, and the compatibility with AR coatings. Non-limiting examples of window materials include high-resistivity silicon, sapphire, quartz, and diamond. In some embodiments, the transmittance and refractive index are selected to be high to enhance responsivity, and the coefficient of thermal expansion is selected to match that of the enclosure of the vacuum package to improve package durability. For example, in some embodiments, the optical window is made up of a window material having a refractive index greater than two in a spectral region overlapping with the absorption band of the optical absorbers.

Impact of Imperfect AR Coatings

The simulations performed to obtain the absorption spectra depicted in FIG. 7 assumed that the AR coating deposited on the outer surface of the optical window was perfect, that is, that it would eliminate reflection at all wavelengths. In practice, AR coatings available in the THz range are effective over a limited spectral region. AR coatings can be formed using various thin-film deposition techniques. Non-limiting examples of such techniques include spin coating and ultrasonic spray coating processes, which both can enable the deposition of AR coatings having thicknesses of the order of a few hundred μm. Various materials can be used as AR coatings. Non-limiting examples of suitable AR coating materials include parylene, quartz, liquid glass coatings, and polymers such as SU-8 and KMPR® photoresists. The selection of AR coating materials can be made based on various factors, including the refractive index, the transparency range, and the mechanical and chemical properties.

In other embodiments, etching processes such as deep reactive ion etching (DRIE) can be used to form AR structures by patterning the optical window. By controlling the shape, depth, and fill factor of the pattern etched on the window surface, it is possible to adjust the effective refractive index at the surface of the window to satisfy various AR requirements. Patterned AR structures characterized by effective refractive indices ranging from the refractive index of the environment (e.g., air) of the window to the refractive index of the window material can be obtained using this approach.

Figure 8A:
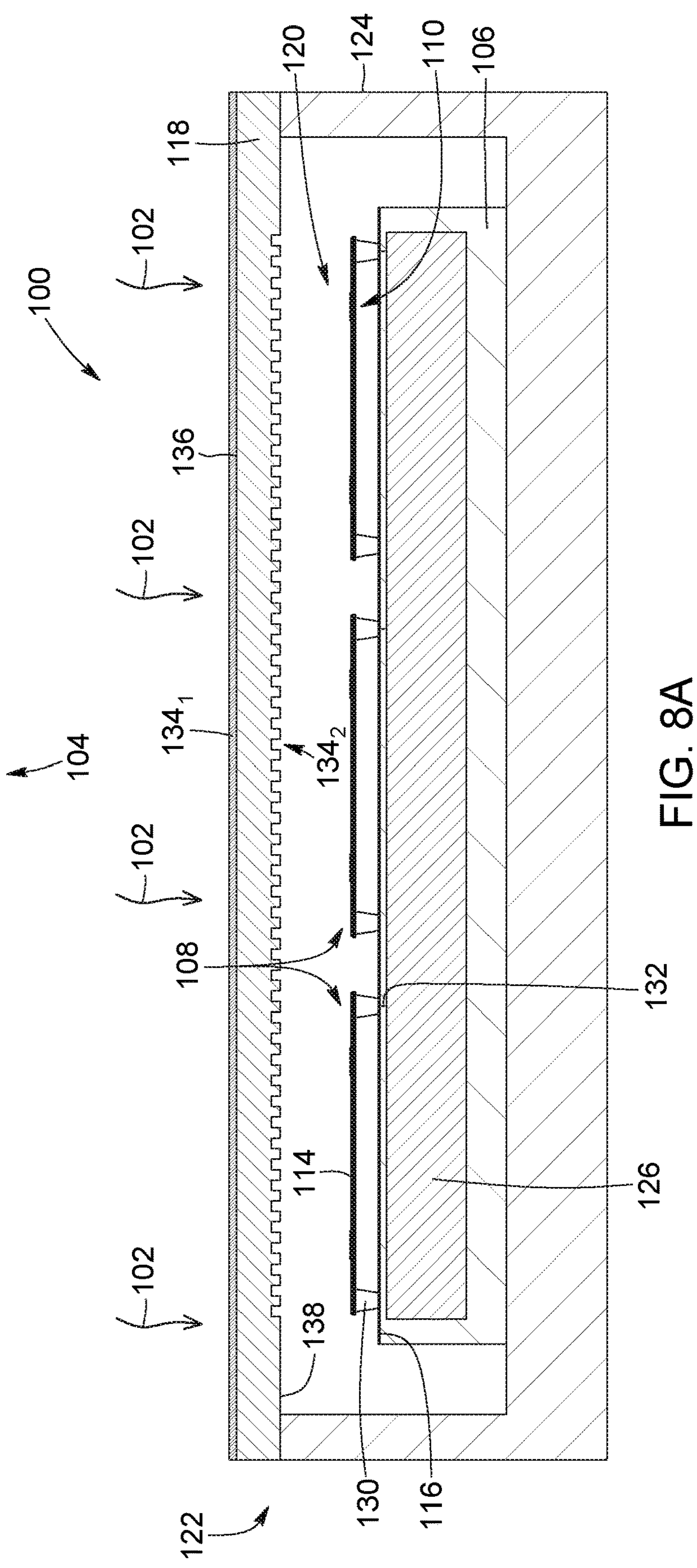
FIGS. 8A to 8D are schematic cross-sectional elevation views of microbolometer detectors, in accordance with four other embodiments.
Figure 8B:
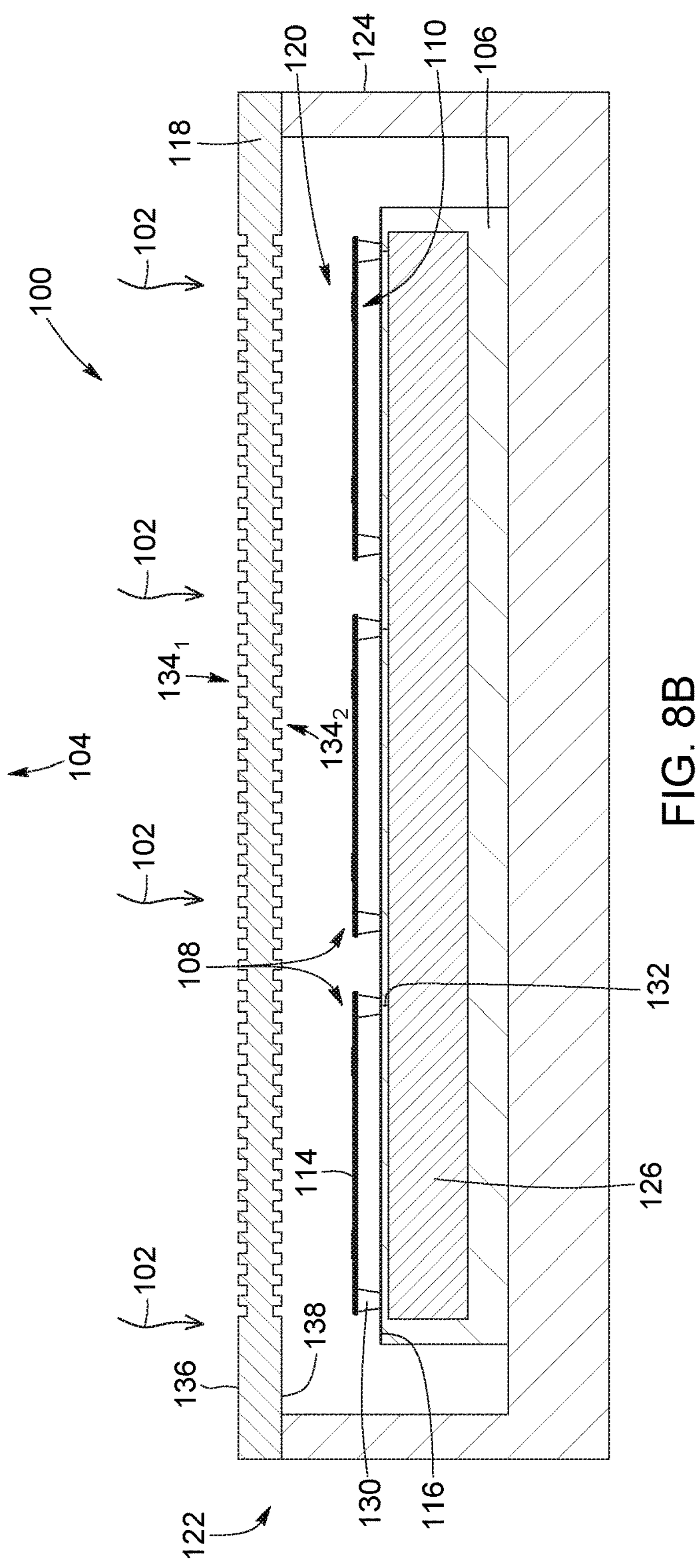
Figure 8C:
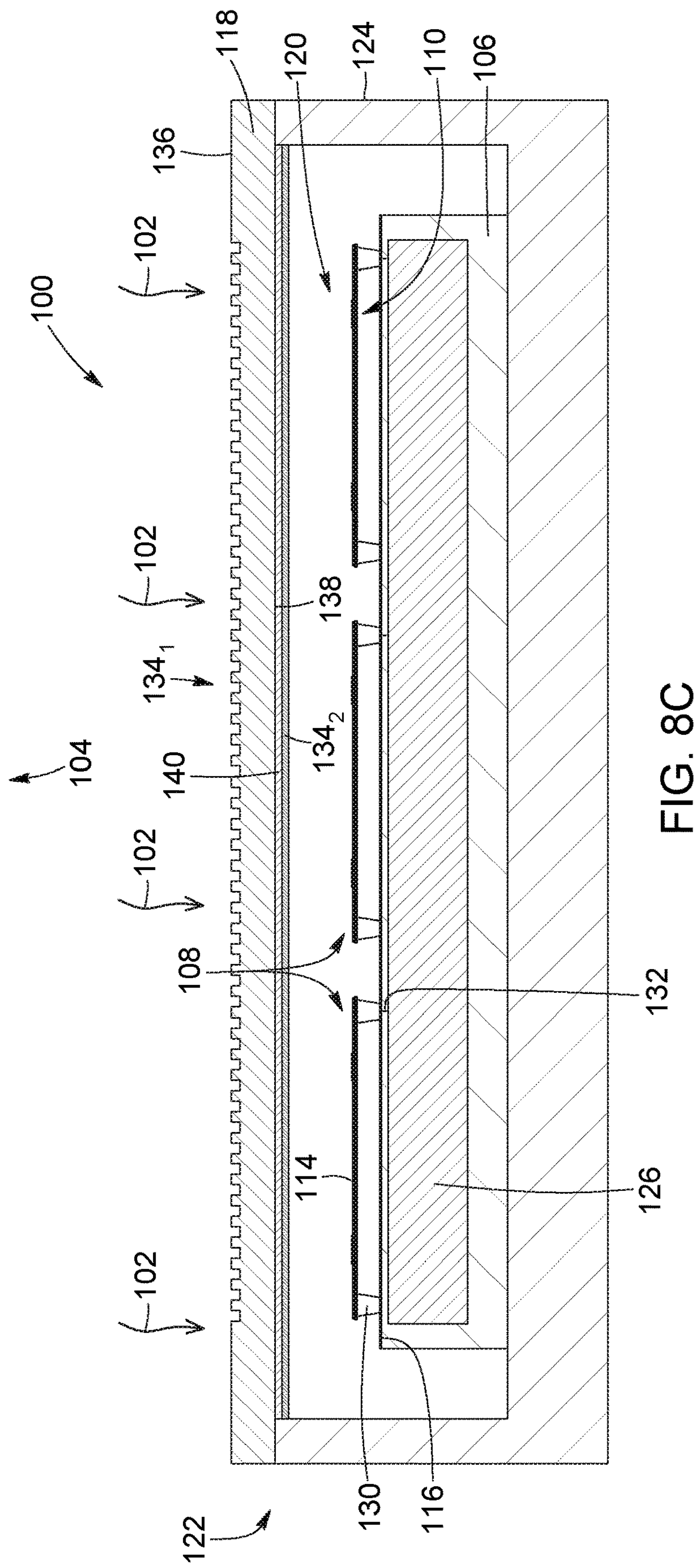
Figure 8D:
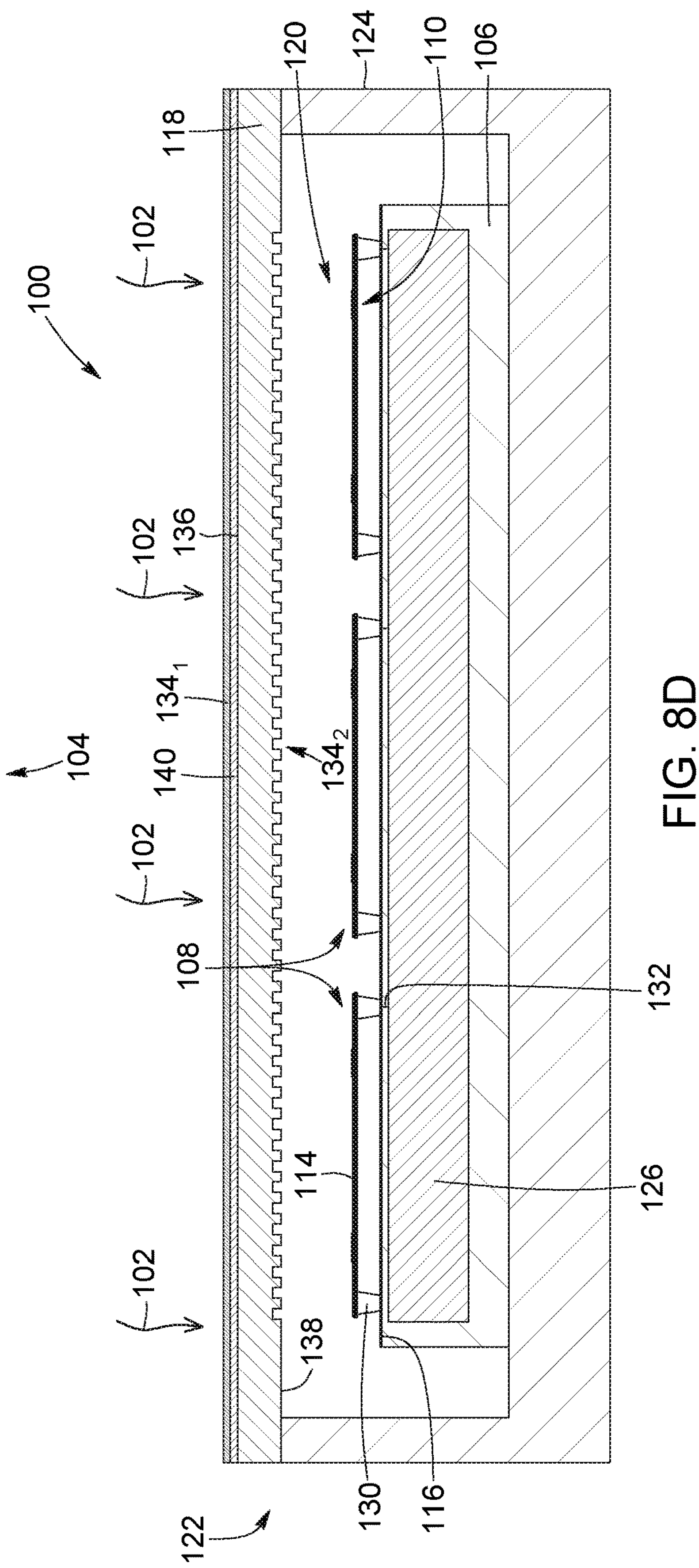

Referring to FIGS. 8A to 8D, there are illustrated four different embodiments of a microbolometer detector 100 configured for detecting electromagnetic radiation 102 received from a scene 104. The embodiments of FIGS. 8A to 8D share several features with previously described embodiments, which will not be described again in detail other than to highlight differences between them. The embodiments of FIGS. 8A to 8D differ from that of FIGS. 1 to 3 in that the microbolometer detectors 100 include AR structures patterned into the optical window 118 using, for example, DRIE or another suitable etching process. In FIG. 8A, the microbolometer detector 100 includes a first AR structure 134$_1$ formed by thin-film deposition of an AR coating on the outer surface 136 of the optical window 118 and a second AR structure 134$_2$ patterned by etching the inner surface 138 of the optical window 118. In FIG. 8B, the microbolometer detector 100 includes a first AR structure 134$_1$ and a second AR structure 134$_2$ patterned by etching the outer surface 136 and the inner surface 138 of the optical window 118, respectively. In FIG. 8C, the microbolometer detector 100 includes a first AR structure 134$_1$ patterned by etching the outer surface 136 of the optical window 118 and a second AR structure 134$_2$ formed by thin-film deposition of an AR coating on the inner surface 138 of the optical window 118. The microbolometer detector 100 also includes an optical filter 140 interposed between the second AR structure 134$_2$ and the optical window 118. In FIG. 8D, the microbolometer detector 100 includes a first AR structure 134$_1$ formed by thin-film deposition of an AR coating on the outer surface 136 of the optical window 118 and a second AR structure 134$_2$ patterned by etching the inner surface 138 of the optical window 118. The microbolometer detector 100 also includes an optical filter 140 interposed between the first AR structure 134$_1$ and the optical window 118. It is noted that patterning AR structures on the inner surface 138 of the optical window 118 using an etching process can be advantageous in situations for which the use of thin-film deposition techniques to form AR coatings inside the vacuum package 122 may cause outgassing, limit vacuum processing temperatures, or otherwise adversely affect the vacuum level inside the vacuum package 122.

Figure 9:
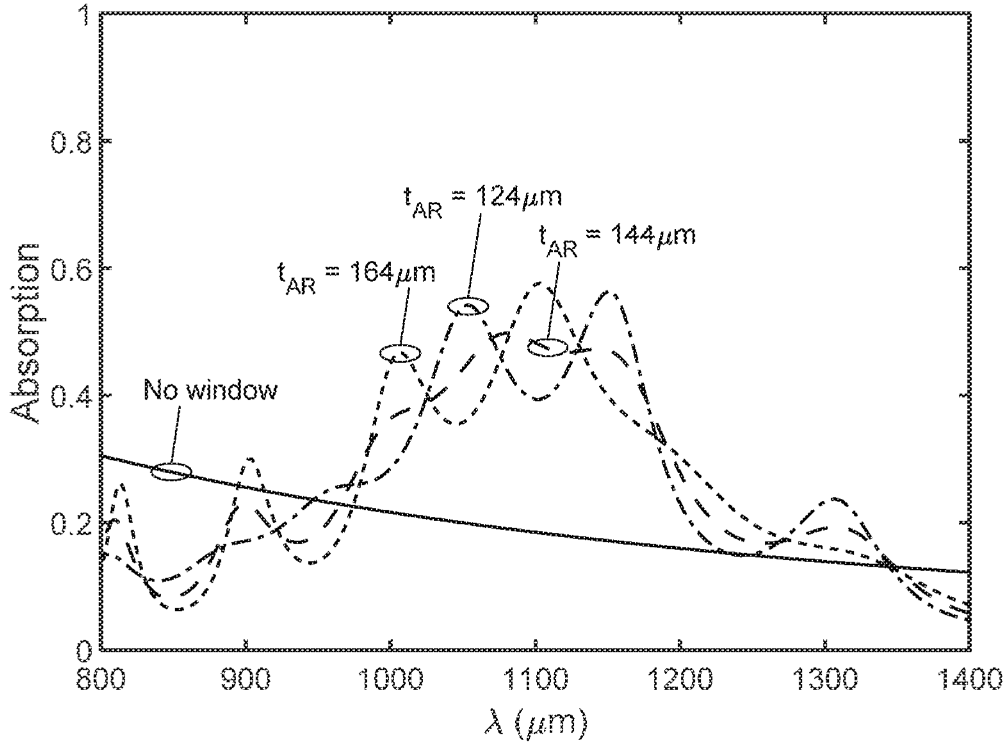
FIG. 9 is a graph depicting four absorption spectra obtained by electromagnetic simulations of four different microbolometer detectors. Three of the curves correspond to the same cavity depth but different values of the antireflective coating thickness $t_{AR}$. The fourth curve corresponds to the same absorption spectrum of a windowless microbolometer detector as depicted in FIG. 7.

The impact of using a single AR layer is that a given resonance condition is fulfilled only within a narrow waveband. Outside of this waveband, resonance effects are canceled or largely attenuated, resulting in an absorption spectrum that depends on the thickness of the optical windows, as discussed below. Because of this dependency, the absorption spectrum is sensitive to the thickness of the AR coating, even in the case of a perfect AR coating. This is illustrated in FIG. 9, which is a graph depicting four absorption spectra obtained by electromagnetic simulations of four different microbolometer detectors. Three of the curves correspond to the same cavity depth (554 μm) but different values of the AR coating thickness $t_{AR}$. The fourth curve corresponds to the same absorption spectrum of a windowless microbolometer detector as that depicted in FIG. 7. The ability to finely control the AR coating thickness can be important not only within the same detector, but also from detector to detector to ensure uniformity and reproducibility of performance among different detectors. In some embodiments, AR coatings which are effective over broader wavebands can be used. Non-limiting examples of broadband AR coatings include multilayer AR coatings and graded-index AR coatings.

Impact of Window Thickness Variations

Figure 10:
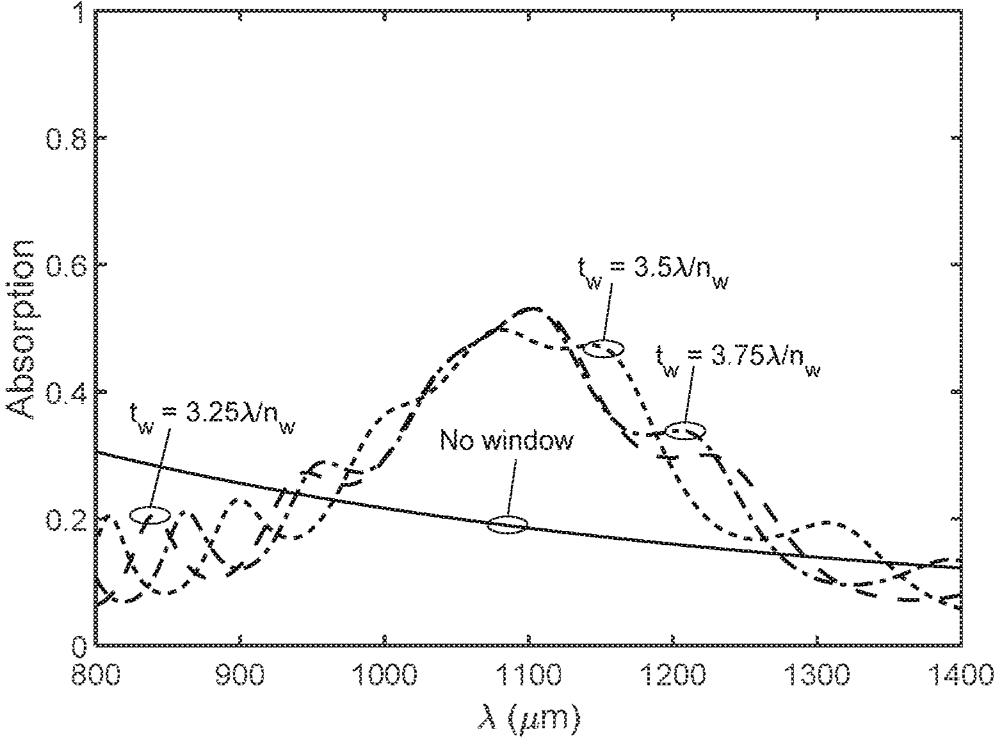
FIG. 10 is a graph depicting four absorption spectra obtained by electromagnetic simulations of four different microbolometer detectors. Three of the curves correspond to the same cavity depth but different values of the optical window thickness $t_w$. The fourth curve corresponds to the same absorption spectrum of a windowless microbolometer detector as depicted in FIG. 7.

Because AR coatings are not perfect, the absorption spectrum of a microbolometer detector will generally depend on the thickness of the optical window 118. This is illustrated in FIG. 10, which is a graph depicting four absorption spectra obtained by electromagnetic simulations of four different microbolometer detectors. Three of the curves correspond to the same cavity depth (554 μm) but different values of the optical window thickness $t_w$. The fourth curve corresponds to the same absorption spectrum of a windowless microbolometer detector as that depicted in FIGS. 7 and 9. FIG. 10 shows that selecting a window thickness that corresponds to an odd number of quarter wavelengths (i.e., $t_w=(2p-1)\lambda/4n_w$, as for the spectra corresponding to $t_w=3.25\lambda/n_w$ and $t_w=3.75\lambda/n_w$) tends to increase the amplitude of the absorption peaks. FIG. 10 also shows that selecting a window thickness that corresponds to an even number of quarter wavelengths (i.e., $t_w=p\lambda/2n_w$, as for the spectrum corresponding to $t_w=3.5\lambda/n_w$) tends to broaden the absorption peaks. The ability to finely control window thickness variations can be important not only within the active area of the same window, but also from window to window to ensure uniformity and reproducibility of performance among different detectors. In some embodiments, techniques such as chemical-mechanical polishing can be used to reduce window thickness tolerances, for example, to within 5 μm.

Impact of Adding an Optical Filter to the Optical Window

In some embodiments, an optical filter can be used to reduce the effective transmittance bandwidth of the optical window 118. Depending on the application, low-pass, high-pass, band-pass, or band-stop filters can be designed and deposited on either or both the inner and outer surfaces of the optical window. Examples of such optical filters 140 are depicted in FIGS. 8C and 8D discussed above. The purpose of the optical filter is to prevent radiation within a given waveband from reaching the array of microbolometers, for example, to decrease the sensitivity of the microbolometer detector to background fluctuations. An example of unwanted signal is thermal infrared radiation generated in the environment of the detector. Various types of optical filters can be used. In some embodiments, the optical filter can be designed using various arrangements of inductive and/or capacitive mesh-grid structures. Such structures may be deposited and patterned into the optical window using various thin-film deposition and photolithography processes. In some embodiments, the impedance of such structures may be considered in the computation of the optimal cavity depth at a given wavelength. In other embodiments, the optical filter can be provided as a uniform material layer or multilayers. For example, certain polymer films can act simultaneously as both infrared radiation filters and AR coatings.

Impact of Further Parameters on the Resonance Condition

Figure 24:
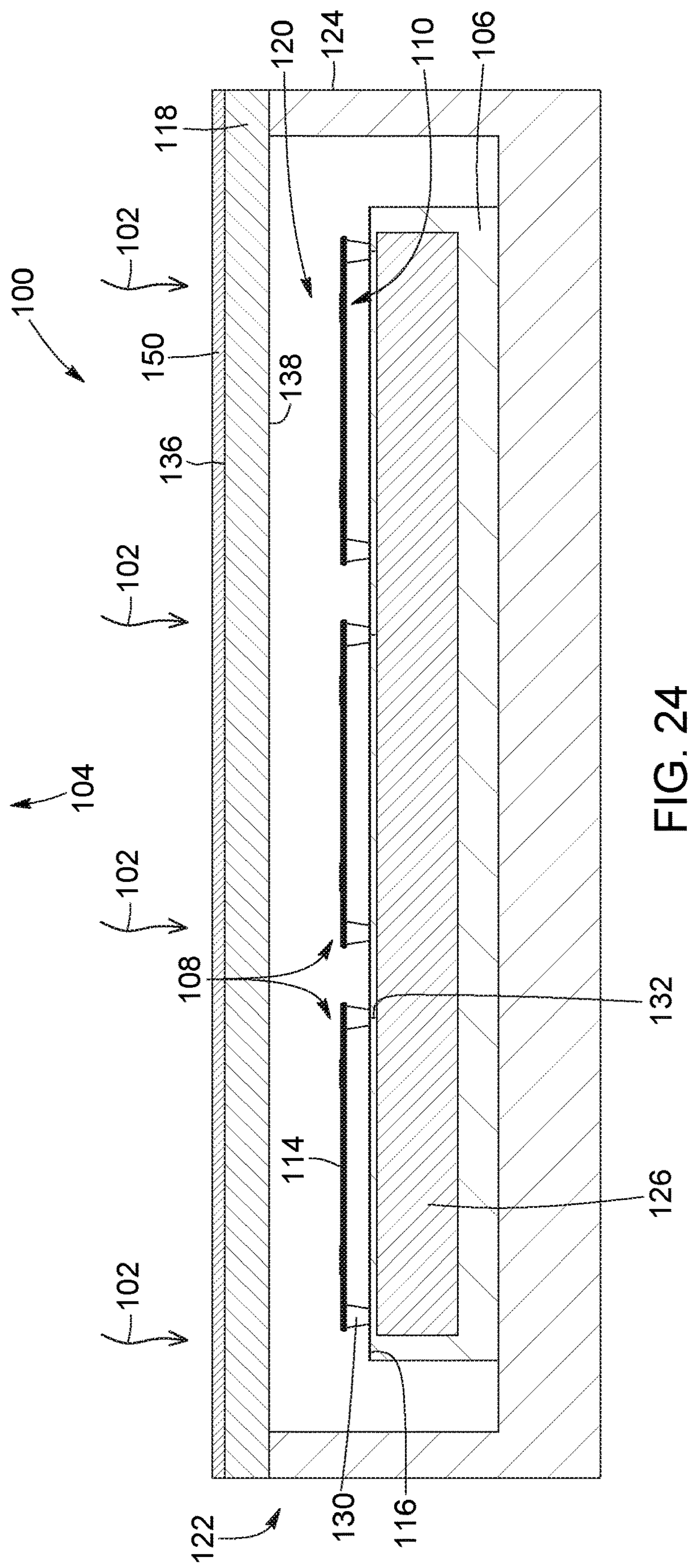
FIG. 24 is a schematic cross-sectional elevation view of a microbolometer detector, in accordance with another embodiment.

The simplified resonance condition given by Equation (3) teaches that the cavity depth $d_c$ should be equal to $(m-1)\lambda/2n_c$ for providing enhanced absorption. However, while Equation (3) can provide a convenient analytic expression that can adequately describe certain features or embodiments of the optical absorbers disclosed herein, it is not an exact relationship. For example, Equation (3) assumes that the reflection phase change $\phi_1$ at the first cavity end (i.e., at the reflector 116) and the reflection phase change $\phi_2$ at the second cavity end (i.e., at the optical window 118) are both exactly equal to $\pi$, so that the round-trip phase accumulation due to wave propagation between the two ends is exactly equal to an integer multiple of $2\pi$. In practice, however, it may happen that the reflector cannot be assumed to be perfect, as it may be lossy and patterned, and thus $\phi_1$ may be different from $\pi$. Similar considerations may apply to the behavior of the optical window 118 (including any AR structure, filtering structure, or metasurface provided therewith), so that $\phi_2$ may also differ from $\pi$. Referring to FIG. 24, in some embodiments the optical window 118 may be provided with at least one metasurface 150 configured to control the reflection phase change of the electromagnetic radiation incident thereon to allow the resonant cavity 120 to be tuned to the absorption band of the optical absorbers 140 with a reduced value of the cavity depth $d_c$. Metasurfaces generally refer to a class of two-dimensional composite materials consisting of arrays of subwavelength scattering elements. The structure and operation of metasurfaces are generally known in the art and need not be described in detail herein other than to facilitate an understanding of the present techniques.

Figure 25:
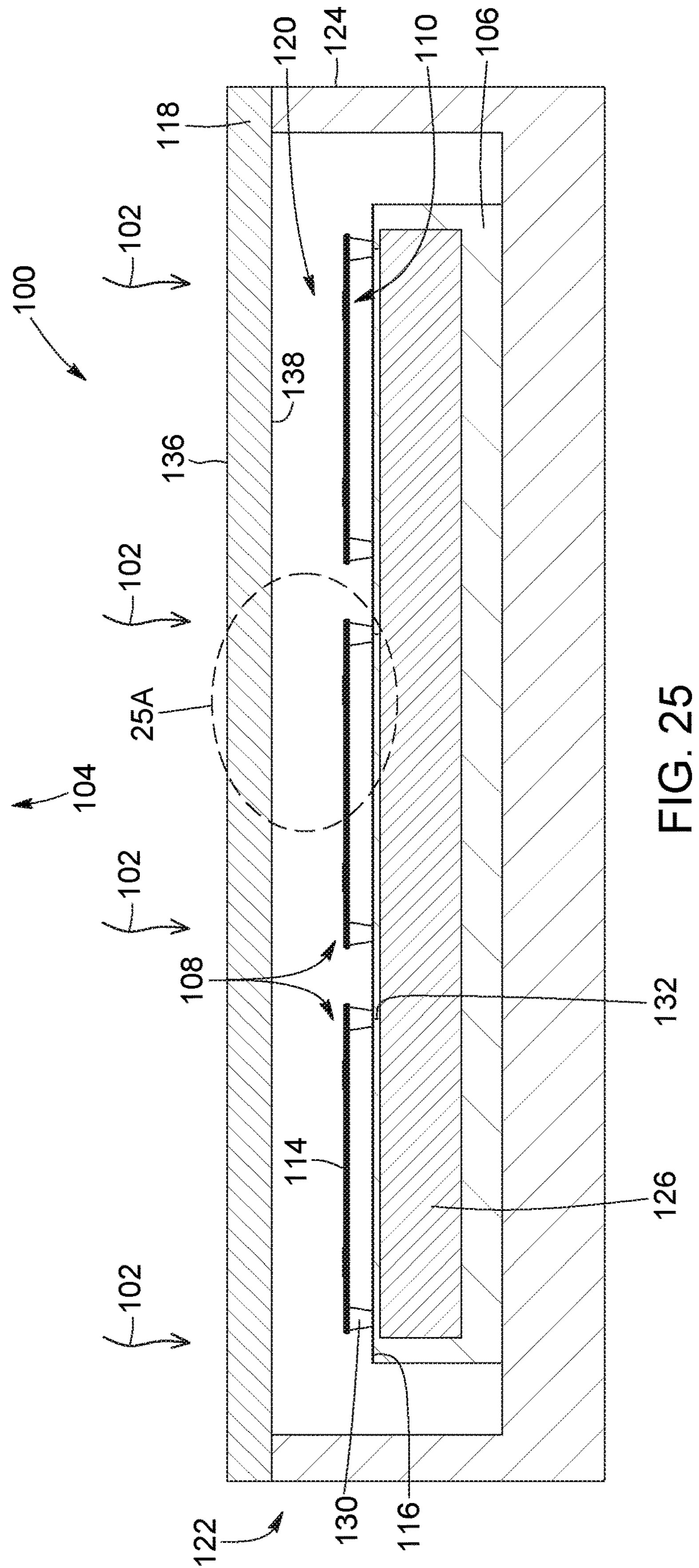
FIG. 25 is a schematic cross-sectional elevation view of a microbolometer detector, in accordance with another embodiment.
Figure 25A:
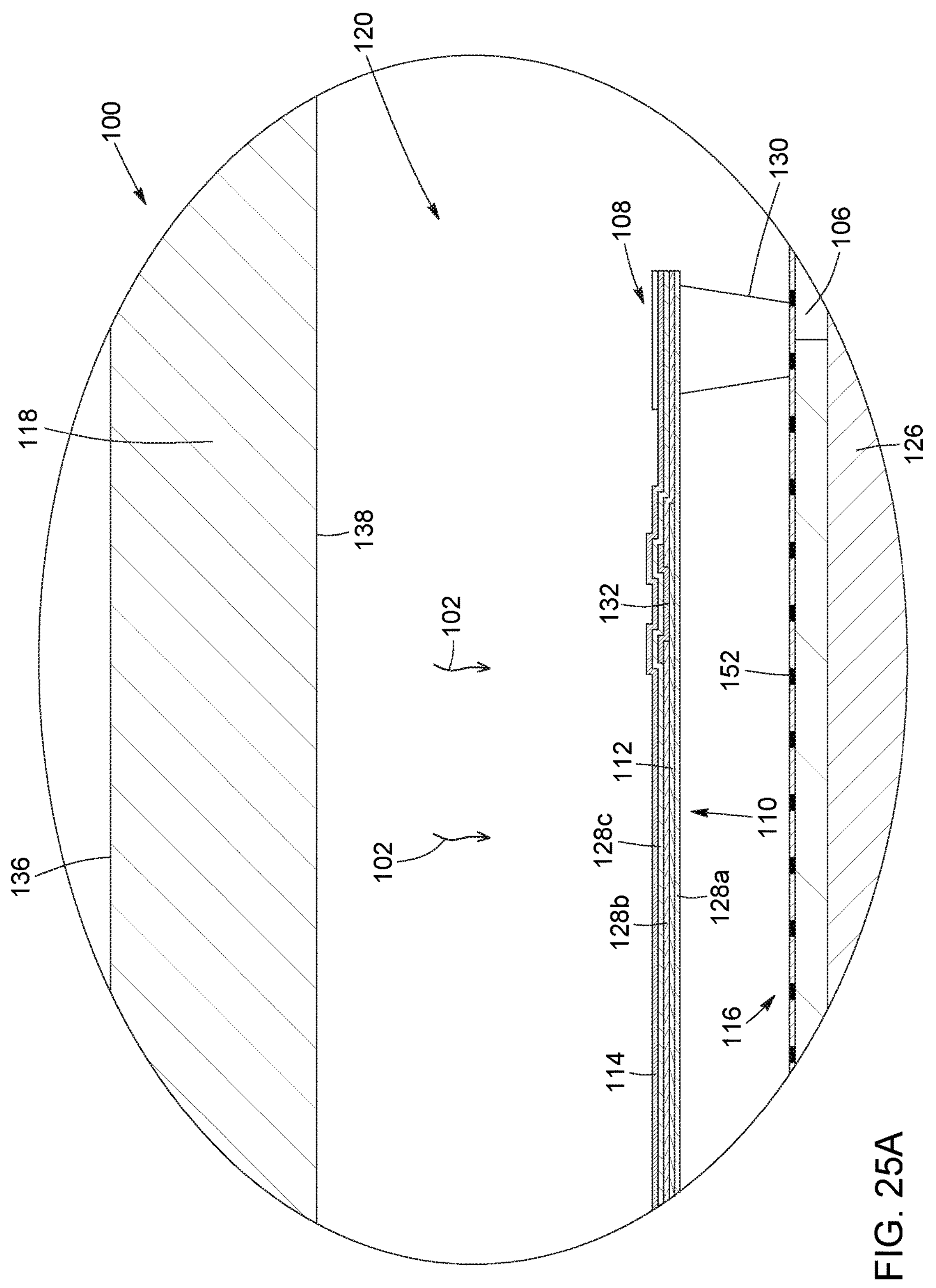
FIG. 25A is an enlargement of portion 25A of FIG. 25.

The microbolometers themselves (including their optical absorbers or any of their constituent elements) may also affect electromagnetic wave propagation inside the resonant cavity and contribute to modify the resonance condition. For example, in embodiments where the microbolometers include FSS-based optical absorbers, the impact of these optical absorbers on the resonance condition can be considered by modifying the value of $\phi_1$. In addition, other elements present inside the resonant cavity may further modify the resonance condition, whether deliberately or not. Non-limiting examples of such intracavity elements include AR coatings, Bragg gratings, dielectrics with controlled thickness, FSSs, metasurfaces, and high-impedance surfaces. Referring to FIGS. 25 and 25A, in some embodiments the reflector 116 may include a high-impedance surface 152 configured to control the reflection phase change of the electromagnetic radiation incident thereon to allow the resonant cavity 120 to be tuned to the absorption band of the optical absorbers 140 with a reduced value of the cavity depth $d_c$. Using a shallower resonant cavity 120 can in turn can improve absorption at large cone angles. The high-impedance surface 152 can be provided by an array of conductive structures deposited on or patterned in the substrate 106. The structure and operation of high-impedance surfaces are generally known in the art and need not be described in detail herein other than to facilitate an understanding of the present techniques.

From the above discussion, it is appreciated that more complex or otherwise different resonance conditions can be determined by considering the round-trip phase change inside the cavity, which includes the phase change upon reflection from the cavity ends and the phase change acquired during propagation of the electromagnetic wave between the cavity ends, and by ensuring that the total phase change corresponds to an integer multiple of $2\pi$ at a wavelength lying within an absorption band of the optical absorbers to provide absorption enhancement.

Further Discussion on Resonant Cavity Design

Further aspects and features related to the resonant cavities of various embodiments are discussed below.

Returning to the embodiment of FIGS. 1 to 3, it is appreciated that both surfaces 136, 138 of the optical window 118 are devoid of AR structures. In such a configuration, the reflections from both window surfaces 136, 138 generally have to be considered to determine the reflection phase change $\phi_2$ at the optical window 118. This can be done by computing the effective impedance $Z_{eff}$ of the optical window 118 as seen from within the resonant cavity 120. From transmission line theory, the effective impedance $Z_{eff}$ can be expressed as follows:

$$Z_{eff} = Z_w \frac{\left[Z_o - iZ_w \tan\left(\frac{2\pi n_w t_w}{\lambda}\right)\right]}{\left[Z_w - iZ_o \tan\left(\frac{2\pi n_w t_w}{\lambda}\right)\right]}. \tag{6}$$

It is noted that when the thickness $t_w$ of the optical window 118 is equal to $p\lambda/2n_w$, $Z_{eff}$ reduces to $Z_0$, so that the window reflectance vanishes. In this case, the microbolometer detector 100 is unaffected by the presence of the optical window 118 at these wavelengths, since no resonant-cavity effect is produced. In contrast, when the thickness $t_w$ of the optical window 118 is equal to $(2p-1)\lambda/4n_w$, $Z_{eff}$ reduces to $$Z_w^2 / Z_o.$$

Figure 11:
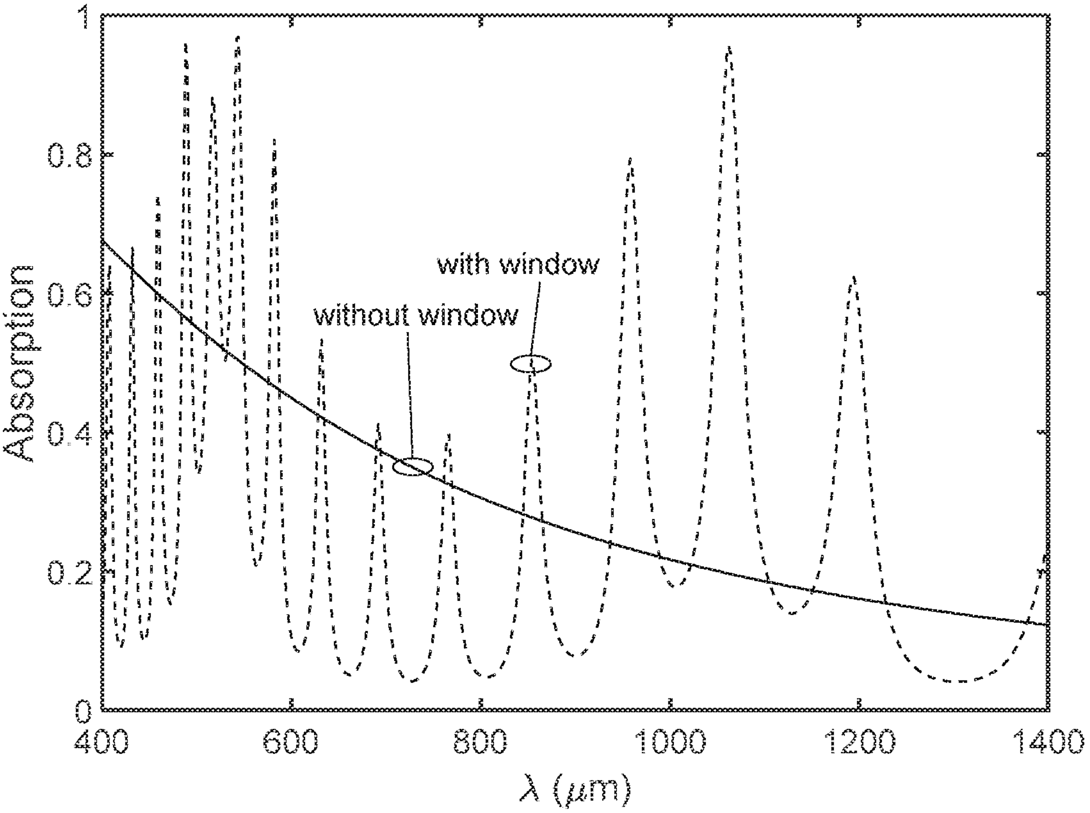
FIG. 11 is a graph depicting two absorption spectra obtained by electromagnetic simulations of two different microbolometer detectors. One curve represents the absorption spectrum of a microbolometer detector provided with an optical window without antireflective coating. The other curve represents the absorption spectrum of a windowless microbolometer detector.

The window reflectance reaches a maximum and becomes even greater than if an AR coating were deposited on the outer surface 136 of the optical window 118, as in FIG. 4, where $Z_{eff}=Z_w$. It is also found that the reflection phase change $\phi_2$ varies from $-\pi$ to $\pi$ between successive reflectance maxima. Because $\phi_2$ is not constant, the resonance condition can be satisfied for values of the cavity depth $d_c$ that are different from $m\lambda/2n_c$. This is illustrated in FIG. 11, which shows a graph depicting two absorption spectra obtained by electromagnetic simulations of two different microbolometer detectors including porous optical absorbers. One curve (dashed line) represents the absorption spectrum of a microbolometer detector provided with an optical window without AR coating, which is similar to the embodiment illustrated in FIG. 3. The other curve (solid line) represents the absorption spectrum of a windowless microbolometer detector. FIG. 11 shows that the absorption spectrum of the microbolometer detector with an optical window exhibits several absorption peaks that match the resonance condition set out in Equation (1) for $\phi_1=\pi$ and $\phi_2(\lambda)\in[-\pi, \pi]$, some of which at wavelengths nearly equal to $4n_c d_c/(2m-1)$.

Figure 12:
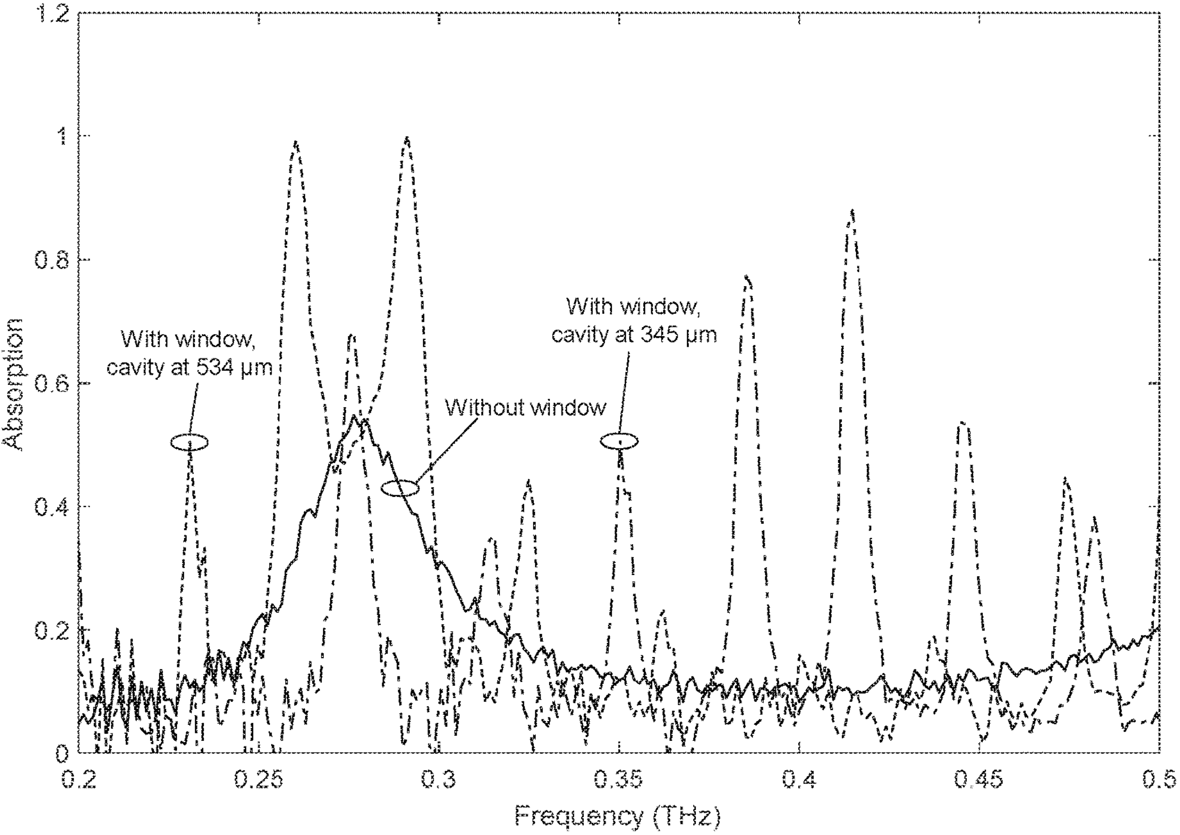
FIG. 12 is a graph depicting three absorption spectra measured by THz time-domain spectroscopy with three different microbolometer detectors. Two of the curves represent the absorption spectra of microbolometer detectors similar to the one illustrated in FIGS. 1 to 3 but where each curve corresponds to a different cavity depth. The third curve represents the absorption spectrum of a windowless microbolometer detector.

FIG. 12 is another example illustrating how the resonant-cavity effect disclosed herein can provide microbolometer detectors with enhanced absorption performance. FIG. 12 is a graph depicting three absorption spectra plotted as functions of the frequency and measured by THz time-domain spectroscopy with three different microbolometer detectors including FSS-based optical absorbers. Two of the curves represent the absorption spectra of microbolometer detectors similar to the one illustrated in FIGS. 1 to 3 but where each curve corresponds to a different cavity depth $d_c$. The third curve (solid line) represents the absorption spectrum of a windowless microbolometer detector. As in FIG. 11, the graph in FIG. 12 shows that the absorption spectra of the microbolometer detectors with an optical window without AR coating exhibit several additional absorption peaks that are not present in the absorption spectrum of the windowless microbolometer detector. The positions of these additional absorption peaks can be varied by adjusting the window thickness and the cavity depth.

The largest absorption enhancement is expected to be achieved when $d_c=m\lambda/2n_c$ and $t_w=(2p-1)\lambda/4n_w$. In such a case, near-unity absorption may be achieved even if the intrinsic absorption of the optical absorbers is significantly less, for example, less than 20%. However, the absorption bandwidth remains narrow in part because the absorption enhancement involves reflections from both window surfaces. As a result, both the window thickness and the cavity depth have to be considered in the computation of the absorption bandwidth, which can make the cavity assembly process more sensitive to misalignment, especially more so for microbolometer detectors fabricated using die-level packaging than for those fabricated using wafer-level packaging. The sensitivity to misalignment can be increased if the source bandwidth is narrower than the detector bandwidth. In such a case, the source could be swept over an oscillation period to help reduce unwanted response variations. Furthermore, frequency sweeping may advantageously reduce spatial coherence and improve image quality. In such a case, the impact of the window thickness is expected to be lessened unless many oscillations are required. In the case of a broadband source, the absorption performance may depend on the opening angle of the cone of incidence. Depending on the spatial resolution required in a given application, designs with smaller cavity depths may be considered, as discussed below with reference to FIGS. 13 and 14.

Figure 13:
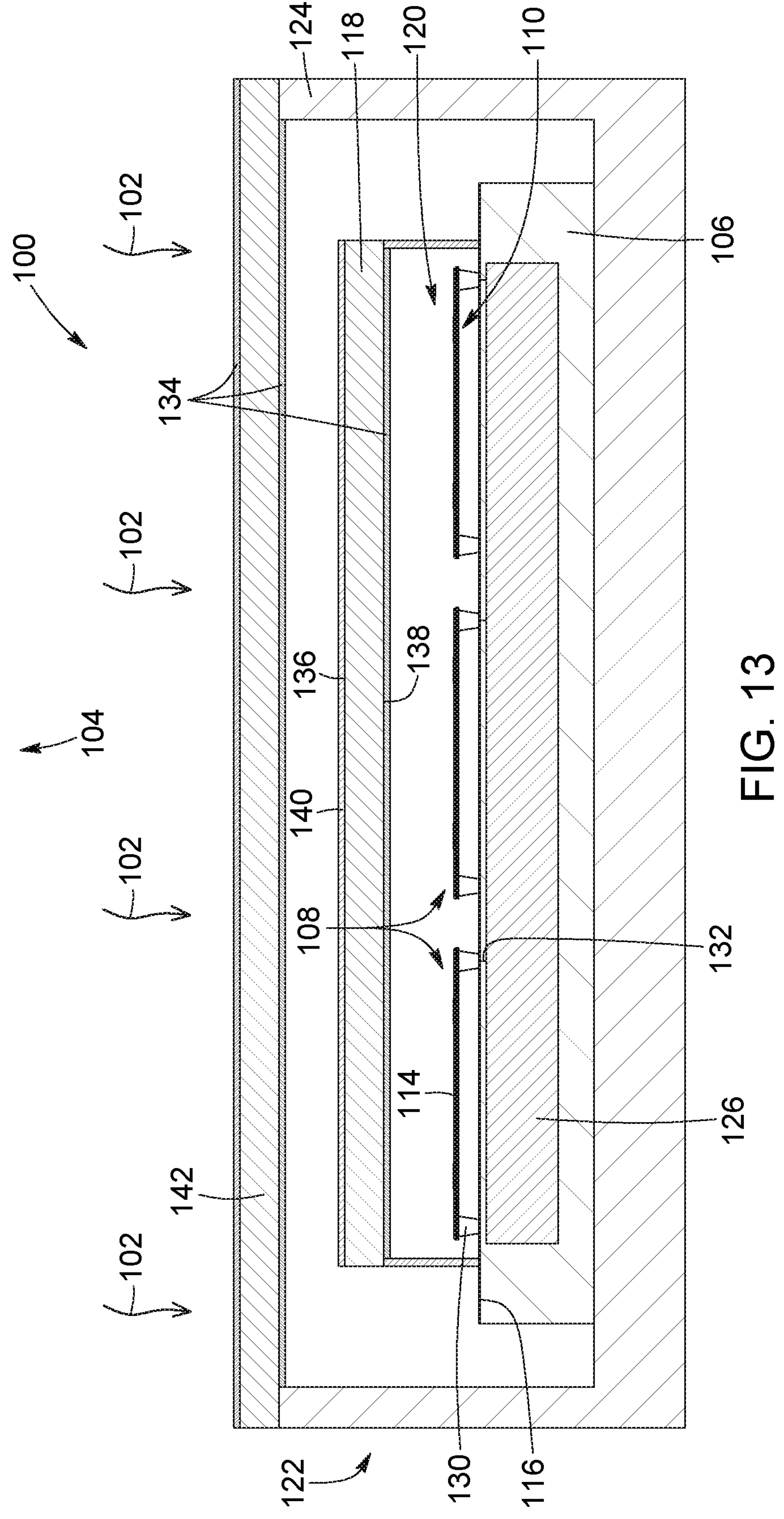
FIG. 13 is a schematic cross-sectional elevation view of a microbolometer detector, in accordance with another embodiment.

FIG. 13 illustrates another embodiment of a microbolometer detector 100 configured for detecting electromagnetic radiation 102 received from a scene 104. The embodiment of FIG. 13 shares several features with previously described embodiments, which will not be described again in detail other than to highlight differences between them. In the embodiment of FIG. 13, the optical window 118 associated with the resonant cavity 120 and the package window 142 associated with the vacuum package 122 are provided by different windows. In particular, the optical window 118 is located inside the vacuum package 122. The optical window 118 includes an AR structure 134 on its inner surface 138 and an optical filter 140 on its outer surface 136, which are used to control the operation of the resonant cavity 120. The package window 142 includes broadband AR structures 134 on both surfaces to enhance its transmittance and help ensure that it is effectively decoupled from the resonant cavity 120.

One benefit of the configuration illustrated in FIG. 13 is that the depth of the resonant cavity 120, which is defined as the vertical spacing between the reflector 116 and the optical window 118, is not affected by the height of the package enclosure 124 of the vacuum package 122. Another benefit is that, unlike the package window 142, the optical window 118 does not have to withstand a pressure difference, and thus can be made significantly thinner than the package window 142. These two benefits make it possible for the resonant cavity 120 to be characterized by both a small depth $d_c$ and a high effective refractive index $n_c$, which can be beneficial to accommodate a smaller depth of focus, as per the discussion above with reference to Equation (5). In some embodiments, the resonant cavity 120 includes a silicon-on-quartz structure having a silicon layer and a quartz layer, where the silicon layer defines the optical window 118 and the quartz layer defines the AR structure 134. In other embodiments, the package window 142 is made of quartz and is assembled to encapsulate the array of microbolometers 108.

Figure 14:
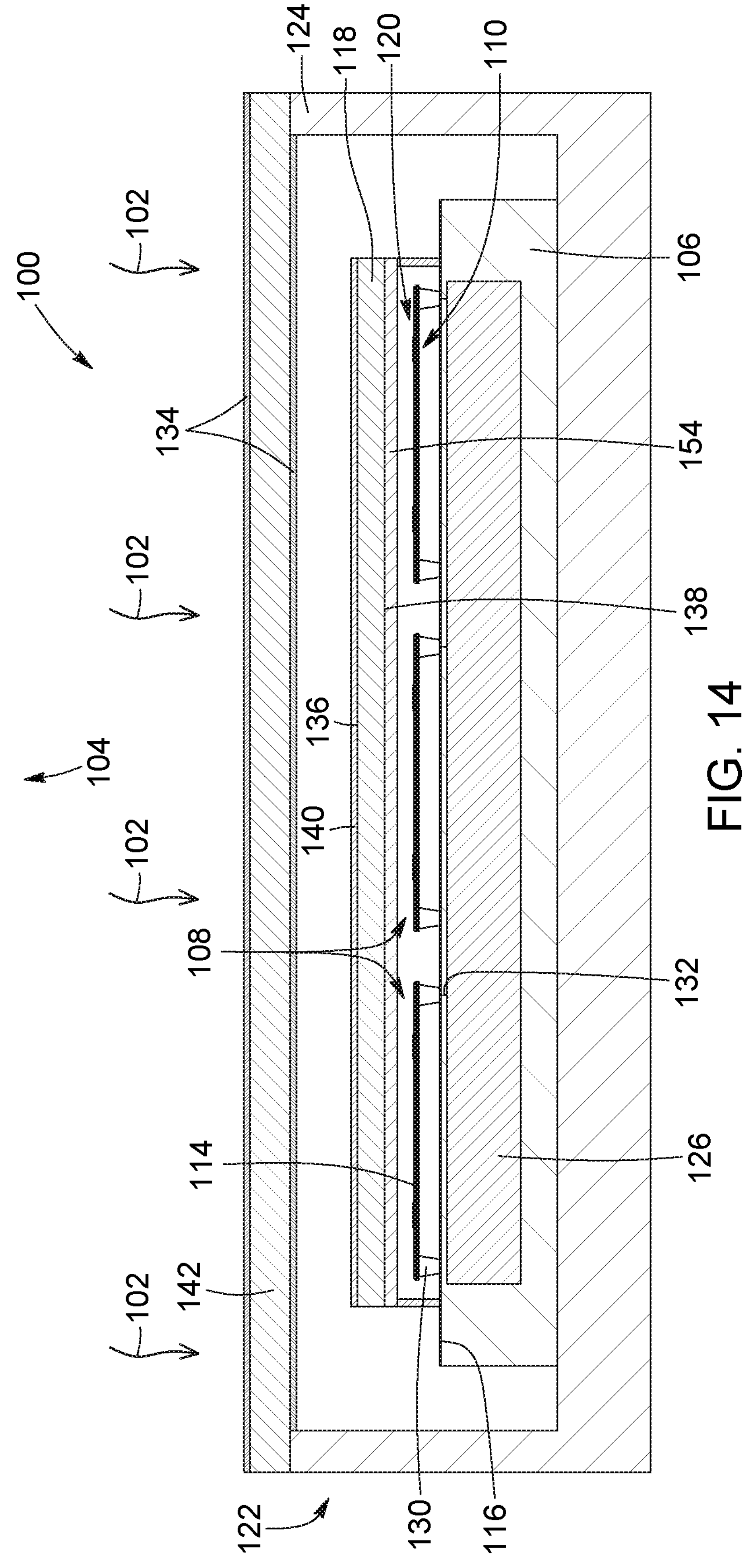
FIG. 14 is a schematic cross-sectional elevation view of a microbolometer detector, in accordance with another embodiment.

FIG. 14 illustrates another embodiment of a microbolometer detector 100 configured for detecting electromagnetic radiation 102 received from a scene 104. The embodiment of FIG. 14 shares several features with previously described embodiments, which will not be described again in detail other than to highlight differences between them. In the embodiment of FIG. 14, the resonant cavity 120 is operated with a near-zero cavity depth. In various embodiments described above, the smallest cavity depth $d_c$ that was considered was of the order of $\lambda/2n_c$. However, in other embodiments, the cavity depth $d_c$ may be less than $\lambda/2n_c$ and, in some cases, significantly less than $\lambda/2n_c$. This can be understood by referring to Equation (1), which provides that $d_c$ could be made close to zero if m=1 and the sum of $\phi_1$ and $\phi_2$ is slightly less than $2\pi$. One approach to achieving such a "near-zero" cavity depth can involve providing the optical window 118 without an AR coating and adjusting its thickness $t_w$ so that $\phi_2=\pi(1-4n_c d_c/\lambda)$, where $4\pi n_c d_c/\lambda$ is the phase change accumulated during propagation inside the resonant cavity 120, and where it has been assumed that $\phi_1=\pi$. For example, in some embodiments, the ratio of the wavelength of interest $\lambda$ to the cavity depth $d_c$ ranges between about 2 and 600.

Figure 15:
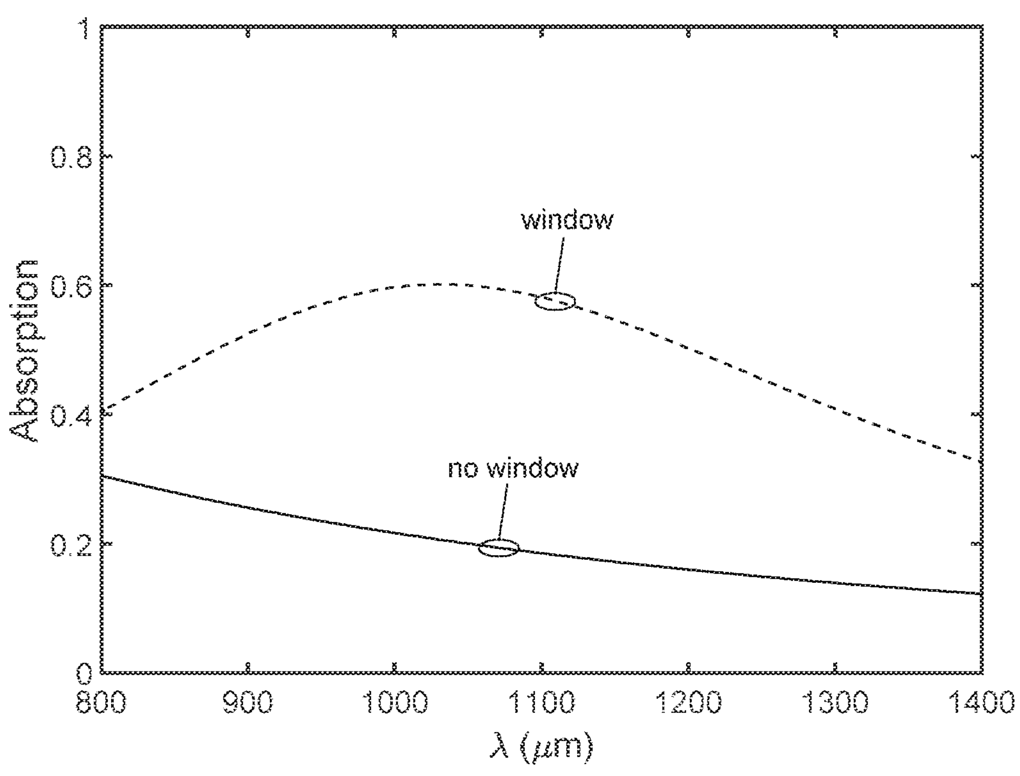
FIG. 15 is a graph containing two absorption spectra obtained by electromagnetic simulations of two different microbolometer detectors including porous optical absorbers. One curve represents the absorption spectrum of a near-zero-cavity-depth microbolometer detector with a window thickness of 27.8 μm. The other curve corresponds to the same absorption spectrum of a windowless microbolometer detector as depicted in FIG. 7.
Figure 16:
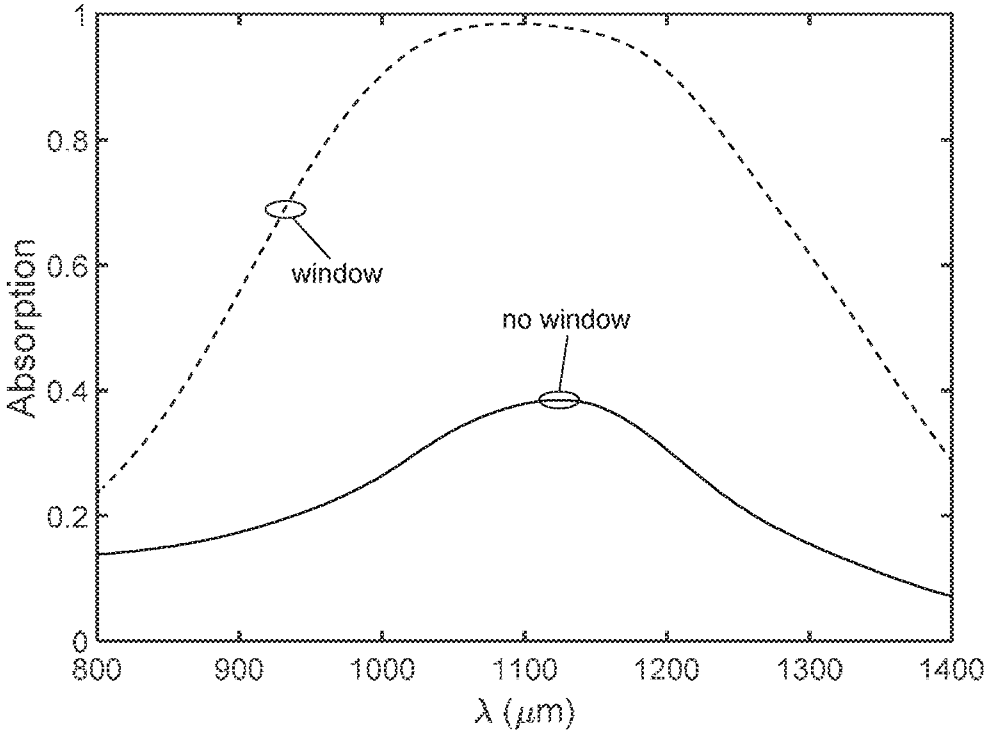
FIG. 16 is a graph containing two absorption spectra obtained by electromagnetic simulations of two different microbolometer detectors including FSS-based optical absorbers. One curve represents the absorption spectrum of a near-zero-cavity-depth microbolometer detector with a window thickness of 40.8 μm, and the other curve represents the absorption spectrum of a windowless microbolometer detector.

Referring to FIGS. 15 and 16, each of these figures depicts a graph containing two absorption spectra obtained by electromagnetic simulations of two different microbolometer detectors. In each figure, one curve (dashed line) represents the absorption spectrum of a microbolometer detector with a cavity depth significantly smaller than $\lambda/2n_c$, such as the embodiment illustrated in FIG. 14, and the other curve (solid line) represents the absorption spectrum of a windowless microbolometer detector. The microbolometer detectors include porous optical absorbers in FIG. 15 and FSS-based optical absorbers in FIG. 16. Comparing the curves associated with the near-zero-cavity-depth microbolometer detectors, it is seen that the absorption enhancement is greater for the detectors with FSS-based absorbers (FIG. 16). This can be attributed to the larger intrinsic absorption of FSS-based absorbers and their effect on the round-trip accumulated phase inside the cavity.

Figure 17:
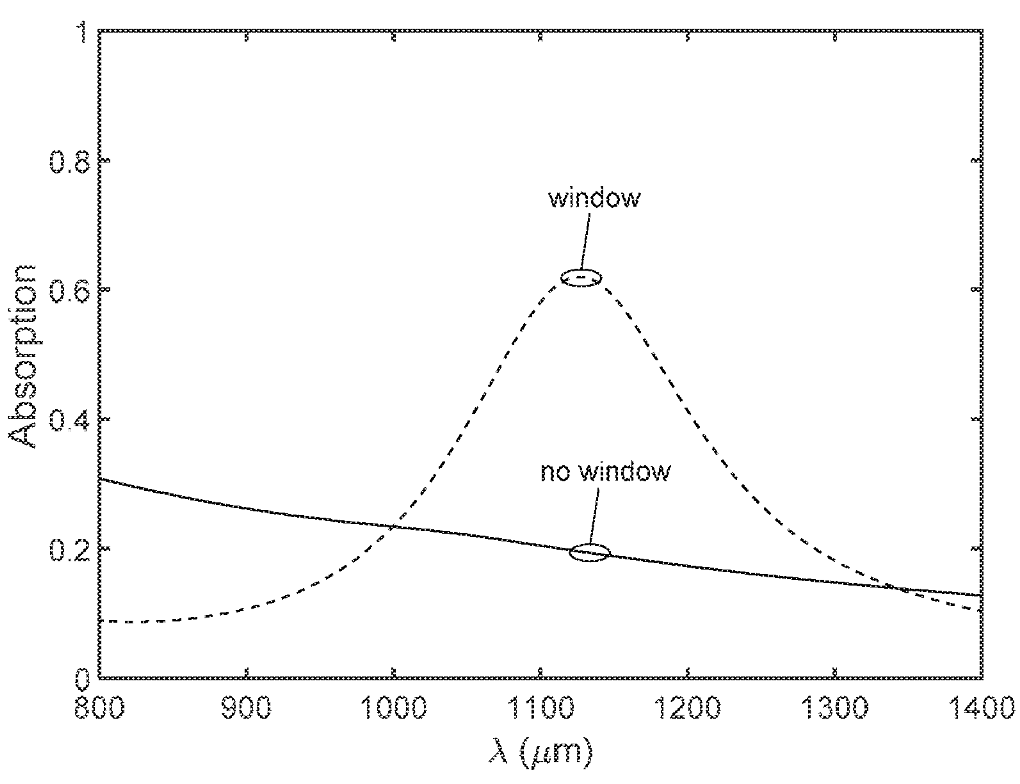
FIG. 17 depicts the same absorption spectra as in FIG. 15, but where the window thickness has been increased to 193 μm.
Figure 18:
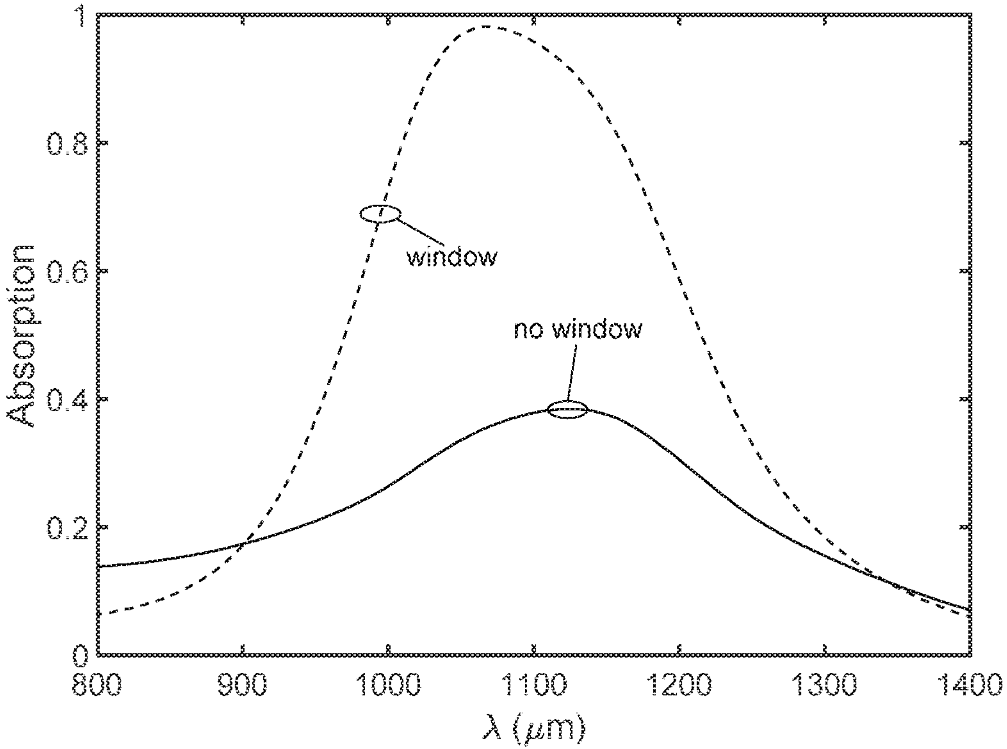
FIG. 18 depicts the same absorption spectra as in FIG. 16, but where the window thickness has been increased to 193 μm.

In some embodiments, the use of a relatively thin optical window 118 (e.g., thinner than 200 μm), such as in the embodiments of FIGS. 13 and 14, may present structural challenges, which can be addressed in different ways. In some embodiments, a stiffening structure 154 configured to mechanically strengthen the optical window 118 may be provided. For example, in some variants the stiffening structure 154 (e.g., a subwavelength honeycomb-like structure) may be etched into the optical window 118. In other variants, such as in FIG. 14, the stiffening structure 154 may be embodied by a lower-index layer bonded to the optical window 118 to enhance rigidity. In other embodiments, the thickness of the optical window may be increased by $\lambda/2n_w$, although it may be at the expense of a narrower absorption bandwidth. This is depicted in FIGS. 17 and 18, which illustrate the same absorption spectra as in FIGS. 15 and 16, but where the window thickness of the near-zero-cavity-depth microbolometer detectors has been increased from 27.8 μm in FIG. 15 and 40.8 μm in FIG. 16 to 193 μm in both FIGS. 17 and 18.

Figure 19:
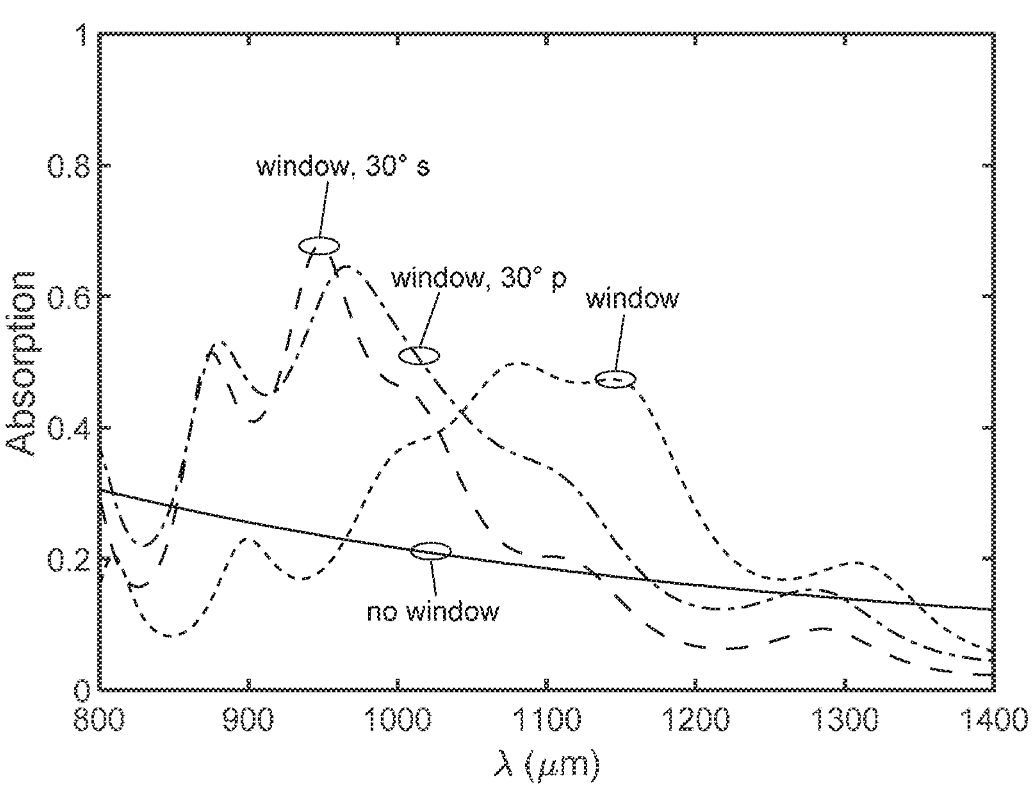
FIG. 19 is a graph depicting four absorption spectra obtained by electromagnetic simulations of different microbolometer detectors. Three of the curves represent the absorption spectra of microbolometer detectors similar to the one illustrated in FIG. 4, but each curve corresponds to incoming radiation received from a different angle of incidence. The fourth curve represents the normal-incidence absorption spectrum of a windowless microbolometer detector.
Figure 20:
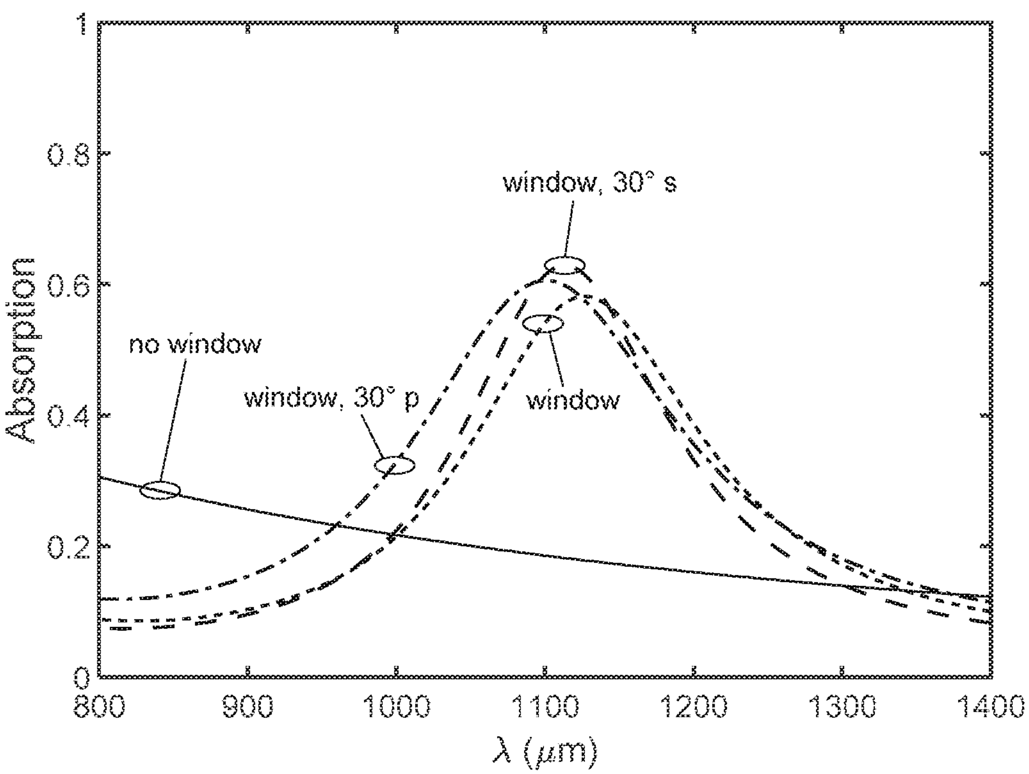
FIG. 20 is a graph depicting four absorption spectra obtained by electromagnetic simulations of different microbolometer detectors. Three of the curves represent the absorption spectra of microbolometer detectors similar to the one illustrated in FIG. 14, but each curve corresponds to incoming radiation received from a different angle of incidence. The fourth curve represents the normal-incidence absorption spectrum of a windowless microbolometer detector.

FIGS. 19 and 20 show how the absorption spectrum of microbolometer detectors with resonant-cavity-enhanced optical absorption can vary as a function of the angle of incidence of the received radiation. Each of FIGS. 19 and 20 is a graph depicting four absorption spectra obtained by electromagnetic simulations of different microbolometer detectors. In FIG. 19, three of the curves represent the absorption spectra of a microbolometer detector similar to the one illustrated in FIG. 4, but each curve corresponds to incoming radiation received from a different angle of incidence, that is, normal incidence, 30° with s-polarization, and 30° with p-polarization. The fourth curve represents the normal-incidence absorption spectrum of a windowless microbolometer detector. In FIG. 20, three of the curves represent the absorption spectra of a microbolometer detector similar to the one illustrated in FIG. 14, but each curve corresponds to incoming radiation received from a different angle of incidence, that is, normal incidence, 30° with s-polarization, and 30° with p-polarization. The fourth curve represents the normal-incidence absorption spectrum of a windowless microbolometer detector. It is seen that the absorption spectrum is less sensitive to the angle of incidence in FIG. 20 than in FIG. 19, which can be explained by the smaller cavity depth and higher-index window.

Figure 21:
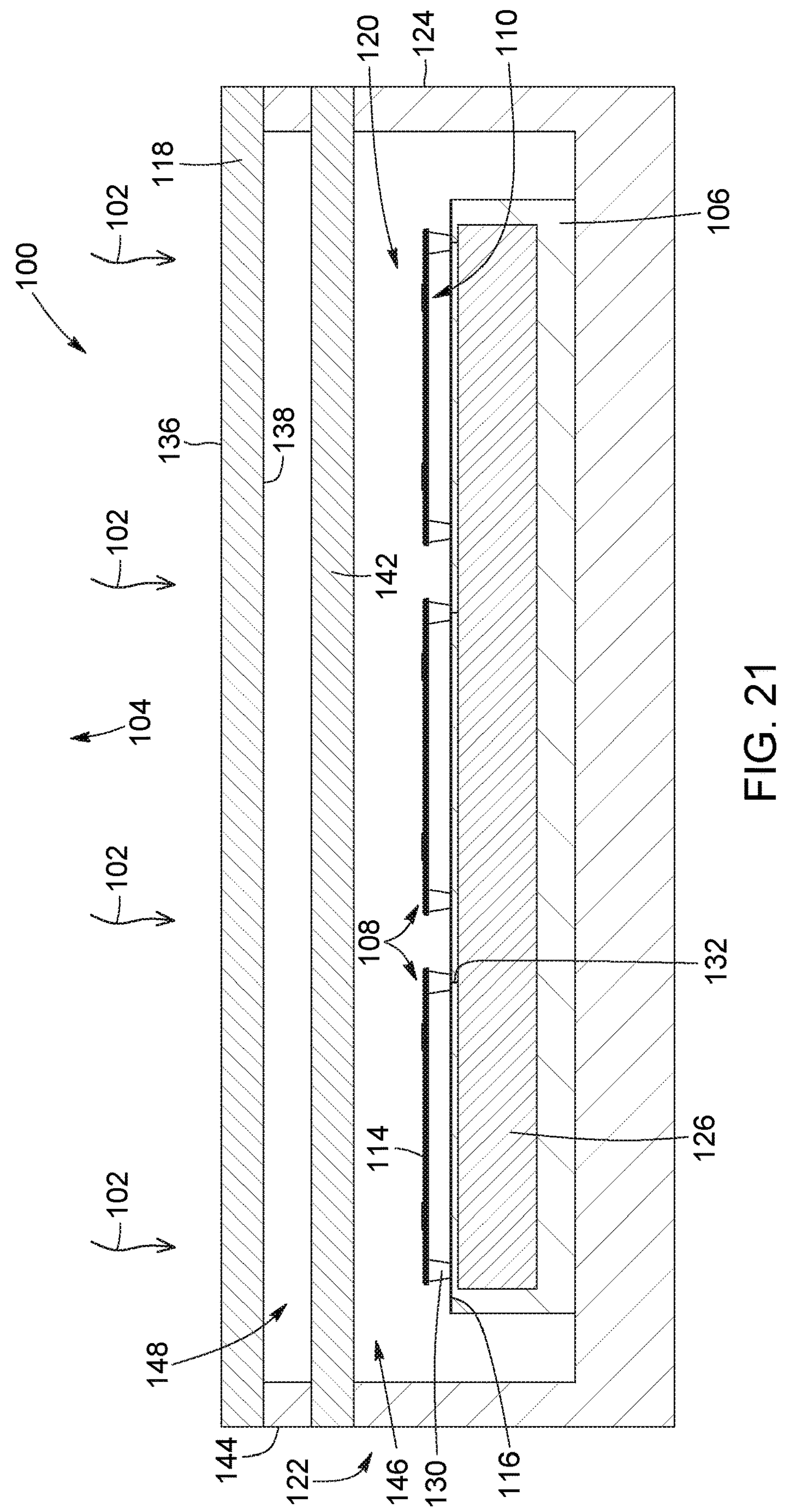
FIG. 21 is a schematic cross-sectional elevation view of a microbolometer detector, in accordance with another embodiment.

Referring to FIG. 21, there is illustrated another embodiment of a microbolometer detector 100 configured for detecting electromagnetic radiation 102 received from a scene 104. The embodiment of FIG. 21 shares several features with previously described embodiments, which will not be described again in detail other than to highlight differences between them. In the embodiment of FIG. 21, the optical window 118 associated with the resonant cavity 120 and the package window 142 associated with the vacuum package 122 are provided by different windows. However, in contrast to the embodiments of FIGS. 13 and 14, the optical window 118 is located outside the vacuum package 122. In addition, in the embodiment of FIG. 21 the height of the optical window 118 relative to the package window 142 is adjustable, for example, by mounting the optical window 118 on a plurality of piezoelectric pedestals 144 projecting upwardly from the top surface of the package window 142. Other height-control devices can be used to adjust the gap between the optical window 118 and the package window 142. Non-limiting examples of such devices include microelectromechanical systems (MEMS), electromagnetic coils and piezoelectric cantilevers. The depth of the resonant cavity 120, which extends between the reflector 116 and the optical window 118, can be adjusted by varying the projection height of the piezoelectric pedestals 144 above the package window 142. In the illustrated configuration, the resonant cavity 120 includes a first cavity region 146, which extends inside the vacuum package 122 between the reflector 116 and the package window 142, and a second cavity region 148, which extends outside the vacuum package 122 between the package window 142 and the optical window 118. In some implementations, AR structures may be formed on both surfaces of the package window 142 in order to reduce the influence of the package window 142 on the response of the resonant cavity 120. In other implementations, a set of predetermined height values corresponding to a set of operating conditions (e.g., a set of wavebands of interest) can be provided and used as appropriate. In yet other implementations, the height of the optical window 118 can be changed more rapidly than the response time of the microbolometer detector, so that the response of the detector effectively represents a time-averaged response, which can be made flat or have any suitable shape within a given waveband. One possible benefit offered by the embodiment of FIG. 21 is the ability to adjust the depth of the resonant cavity 120 remotely, that is, from outside the vacuum package 122.

Figure 22A:
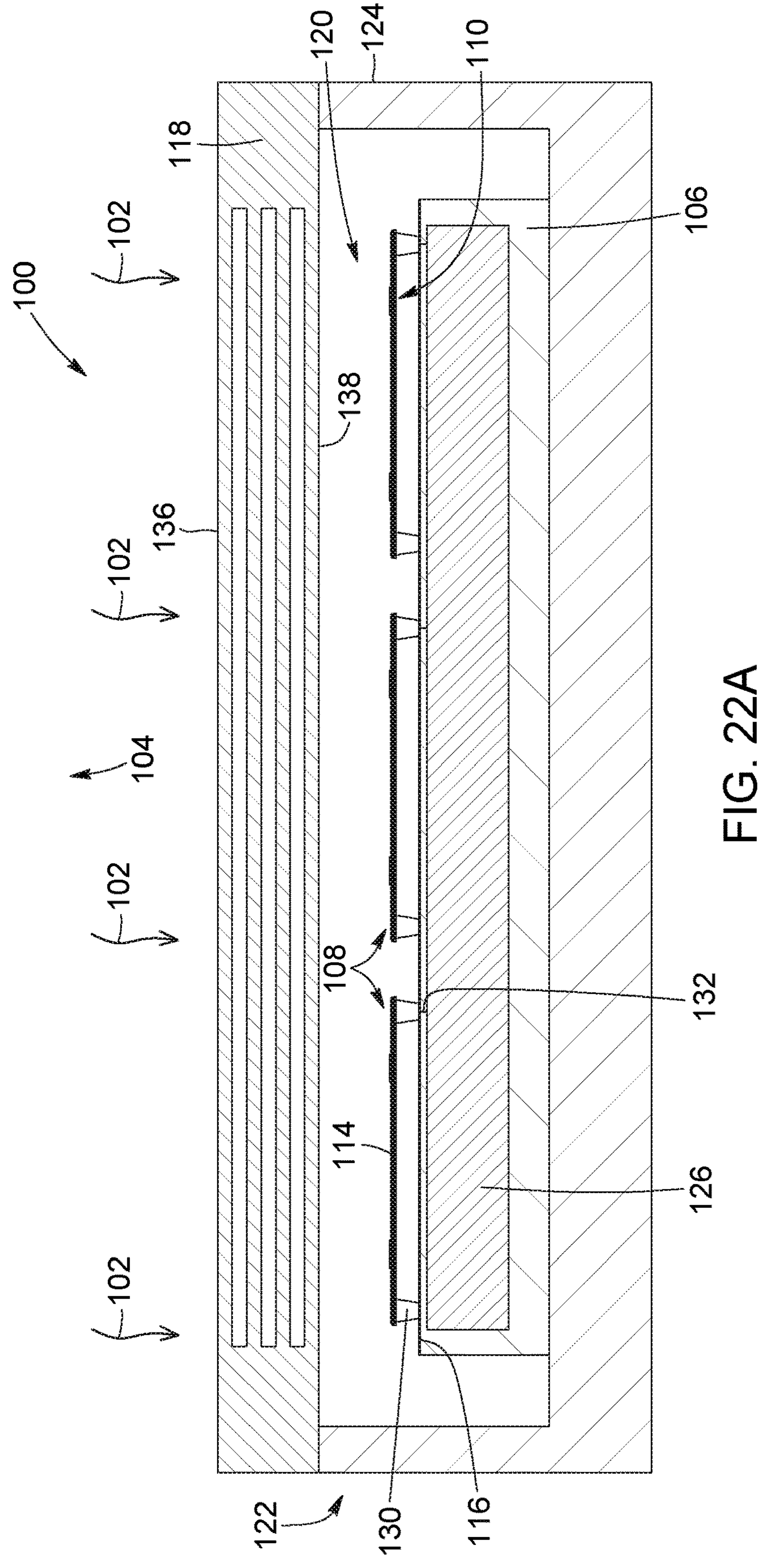
FIGS. 22A and 22B are schematic cross-sectional elevation views of microbolometer detectors, in accordance with two other embodiments.
Figure 22B:
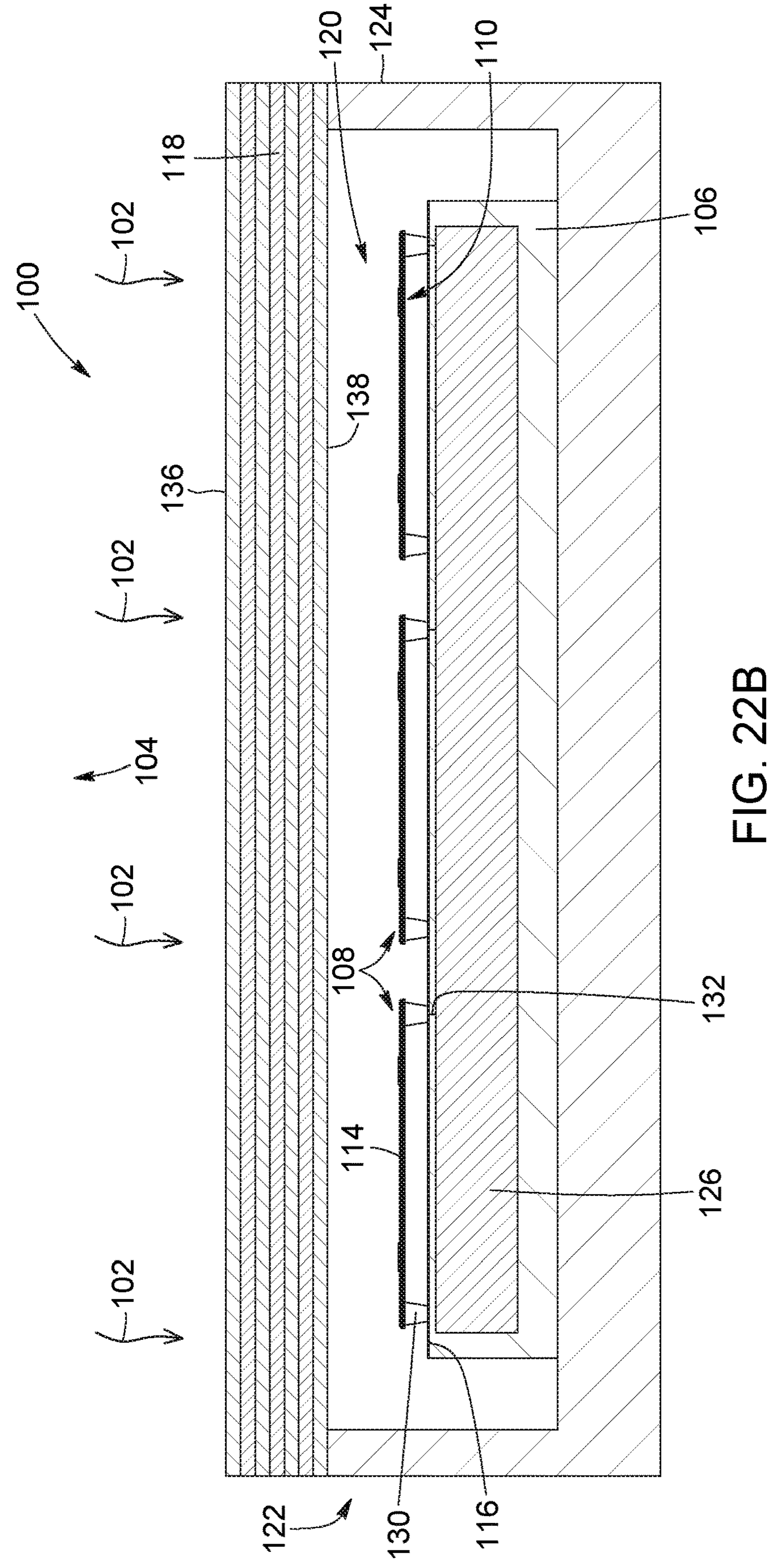

Referring to FIGS. 22A and 22B, there are illustrated other embodiments of a microbolometer detector 100 configured for detecting electromagnetic radiation 102 received from a scene 104. The embodiments of FIGS. 22A and 22B share several features with previously described embodiments, which will not be described again in detail other than to highlight differences between them. The illustrated embodiments use Bragg cavity (FIG. 22A) and grating (FIG. 22B) structures as the optical window 118 to provide further control and adjustment of the response and absorption-enhancement performance of the resonant cavity 120. Both approaches can be implemented for operation over a broad spectral range by appropriate selection of the refractive indices, thicknesses, number, and arranging order of the layers and cavities forming the Bragg cavity and grating structures. Various techniques can be used to fabricate these structures, including deep etching, film coating, laser densification, ion implantation, film lamination, and wafer bonding.

Figure 23A:
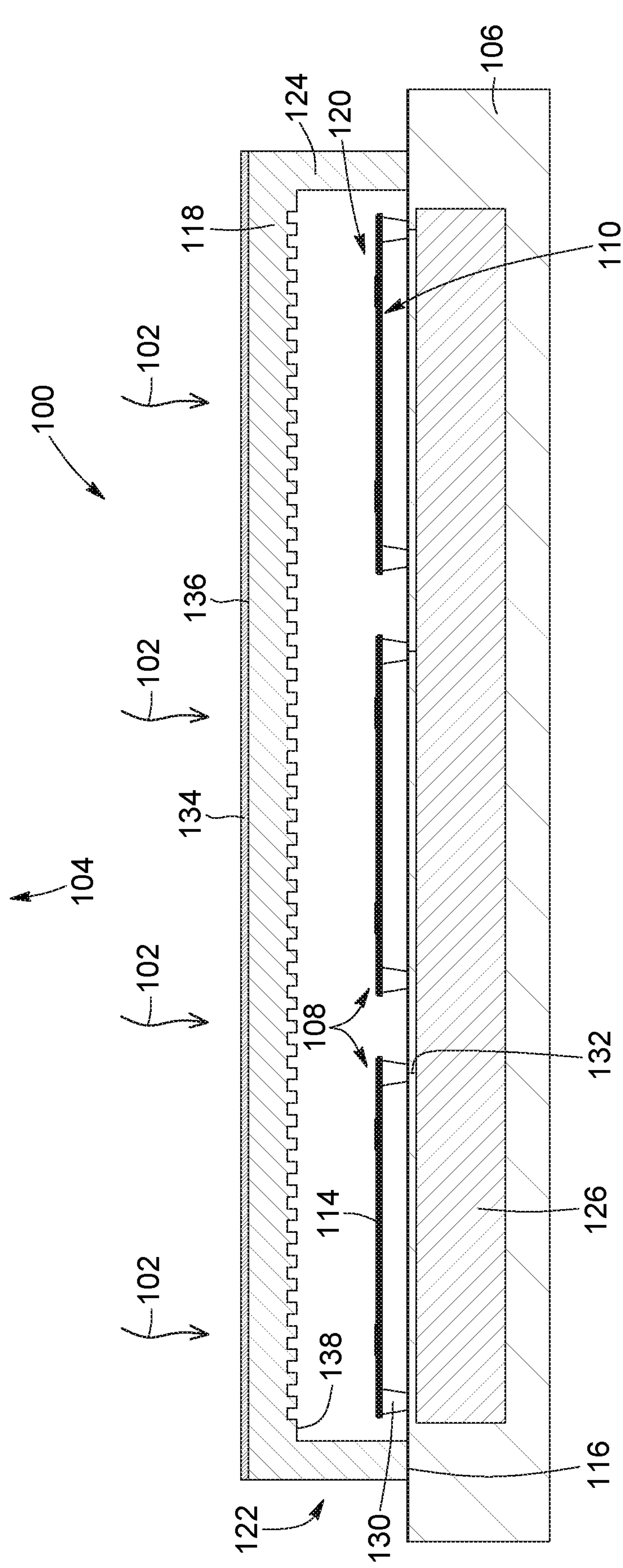
FIGS. 23A and 23B are schematic cross-sectional elevation views of microbolometer detectors, in accordance with two other embodiments.
Figure 23B:
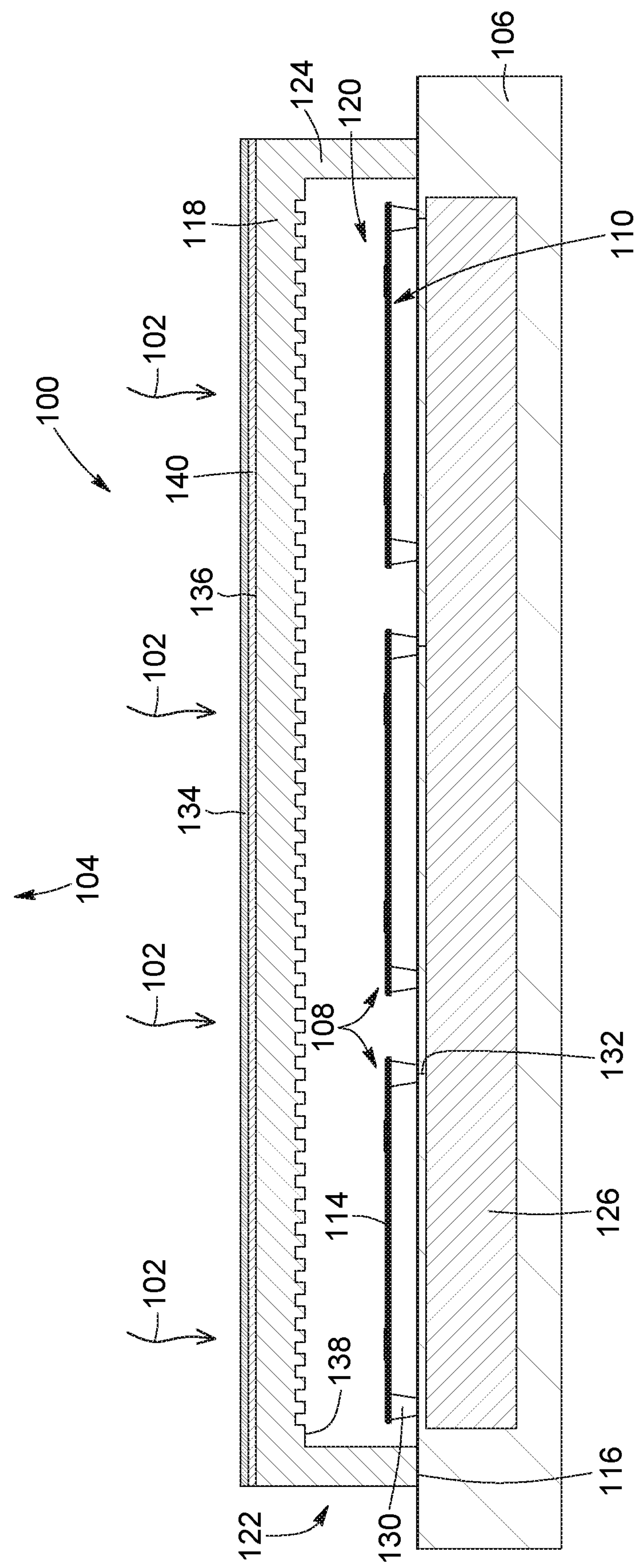

In some embodiments, the microbolometer detectors can be packaged using wafer-level packaging rather than die-level metallic and ceramic packaging. Wafer-level packaging uses wafer-level bonding and flip-chip bonding processes, which are commonly used for hybrid integration of MEMS devices. One possible benefit offered by wafer-level packaging is the ability to provide compact microbolometer detector packages with enhanced control of the cavity depth. FIGS. 23A and 23B illustrate two embodiments of a microbolometer detector 100 packaged using wafer-level packaging. In these embodiments, the optical window 118 can be fabricated on a wafer, for example, using photolithography and DRIE processes. As discussed above, the AR structures 134 can be provided as AR coatings deposited on the optical window 118 using any suitable thin-film deposition techniques (e.g., spray coating, screen printing, spin coating, chemical vapor deposition, thermal diffusion, or film lamination techniques) or as AR patterns etched into the optical window 118 (e.g., using DRIE or any other suitable etching techniques). The optical filter 140 in FIG. 23B can be provided to control the spectrum of the electromagnetic radiation 102 reaching the optical window 118 and reduce undesirable thermal noise from off-band radiation. The optical filter 140 can include various arrangements of inductive and/or capacitive mesh-grid structures and be fabricated using various metal-film deposition techniques (e.g., ion beam sputtering, thermal evaporation, or printing) and patterned using photolithography processes. Inductive and capacitive mesh patterns or a combination of both can be used to adjust the transmittance band required for the FPA package windows and to reduce undesirable thermal noise resulting from off-band radiation. Once these steps have been completed, the wafer is diced and flip-bonded to the substrate 106 to form a wafer-level vacuum package 122.

Numerous modifications could be made to the embodiments described above without departing from the scope of the appended claims.

The invention claimed is:

1. A microbolometer detector for detecting electromagnetic radiation, comprising:
- a substrate;
- a vacuum package;
- an array of microbolometers disposed on the substrate inside the vacuum package, each microbolometer comprising:
  - a platform supported above the substrate;
  - a thermistor disposed on the platform and having an electrical resistance that varies with a temperature of the thermistor; and
  - an optical absorber in thermal contact with the thermistor and comprising a frequency-selective surface, the optical absorber being configured to absorb the electromagnetic radiation to generate heat and change the temperature of the thermistor;
- a reflector disposed on the substrate under the array of microbolometers; and
- an optical window configured to allow the electromagnetic radiation to pass therethrough and reach the optical absorbers, wherein the optical window is spaced apart from the reflector to form therebetween an optically resonant cavity having a cavity depth, the resonant cavity being tuned to an absorption band of the optical absorbers.

2. The microbolometer detector of claim 1, wherein the absorption band of the optical absorbers extends at least partly within a waveband ranging from about 30 μm to about 3000 μm.

3. The microbolometer detector of claim 1, further comprising an antireflective structure provided on at least one of an inner surface and an outer surface of the optical window.

4. The microbolometer detector of claim 3, wherein the antireflective structure comprises an antireflective coating deposited on the optical window.

5. The microbolometer detector of claim 3, wherein the antireflective structure comprises an antireflective pattern etched into the optical window.

6. The microbolometer detector of claim 1, wherein the vacuum package comprises a package window that provides the optical window of the resonant cavity.

7. The microbolometer detector of claim 1, wherein the vacuum package comprises a package window distinct from the optical window and configured to allow the electromagnetic radiation to pass therethrough and reach the optical absorbers.

8. The microbolometer detector of claim 7, wherein the optical window is disposed inside the vacuum package.

9. The microbolometer detector of claim 8, wherein the cavity depth is smaller than $\lambda/2n_c$, where $\lambda$ is a wavelength of interest of the electromagnetic radiation absorbed by the optical absorbers and $n_c$ is the effective refractive index of the resonant cavity.

10. The microbolometer detector of claim 9, wherein a ratio of the wavelength of interest to the cavity depth ranges between about 2 and 600.

11. The microbolometer detector of claim 7, wherein the optical window is disposed outside the vacuum package.

12. The microbolometer detector of claim 11, further comprising a height-control device configured to support the optical window and control its height above the package window to adjust the cavity depth.

13. The microbolometer detector of claim 1, wherein the optical window comprises a Bragg cavity structure.

14. The microbolometer detector of claim 1, wherein the optical window comprises a Bragg grating structure.

15. The microbolometer detector of claim 1, wherein the optical window is made up of a material having a refractive index greater than two in a spectral region overlapping with the absorption band of the optical absorbers.

16. The microbolometer detector of claim 1, further comprising at least one optical filter provided on the optical window.

17. The microbolometer detector of claim 1, wherein the reflector comprises an array of conductive structures deposited on or patterned in the substrate and configured to control a reflection phase change of the electromagnetic radiation incident thereon to allow the resonant cavity to be tuned to the absorption band of the optical absorbers with a reduced value of the cavity depth.

18. The microbolometer detector of claim 1, wherein the optical window comprises at least one metasurface configured to control a reflection phase change of the electromagnetic radiation incident thereon to allow the resonant cavity to be tuned to the absorption band of the optical absorbers with a reduced value of the cavity depth.

19. The microbolometer detector of claim 1, further comprising a stiffening structure configured to mechanically strengthen the optical window.

20. The microbolometer detector of claim 1, wherein the vacuum package and the optical window are formed by wafer-level packaging.

* * * * *